US011507577B2

(12) United States Patent
Raizman et al.

(10) Patent No.: US 11,507,577 B2
(45) Date of Patent: Nov. 22, 2022

(54) OPTIMIZING AGGREGATES OVER CORRELATED WINDOWS IN A STREAM-QUERY SYSTEM

(71) Applicant: Microsoft Technology Licensing, LLC, Redmond, WA (US)

(72) Inventors: Alexander Raizman, Bellevue, WA (US); Wentao Wu, Bellevue, WA (US); Philip A. Bernstein, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 245 days.

(21) Appl. No.: 16/886,420

(22) Filed: May 28, 2020

(65) Prior Publication Data

US 2021/0382895 A1    Dec. 9, 2021

(51) Int. Cl.
*G06F 16/00* (2019.01)
*G06F 16/2453* (2019.01)
*G06F 16/2455* (2019.01)

(52) U.S. Cl.
CPC .. *G06F 16/24542* (2019.01); *G06F 16/24568* (2019.01)

(58) Field of Classification Search
CPC .................. G06F 16/24542; G06F 16/24568
USPC ........................................................ 707/718
See application file for complete search history.

(56) References Cited

U.S. PATENT DOCUMENTS

| 8,478,743 B2 * | 7/2013 | Chandramouli .. G06F 16/24568 707/718 |
| 2014/0095444 A1 | 4/2014 | Deshmukh et al. |
| 2016/0283554 A1 * | 9/2016 | Ray ................... G06F 16/24568 |

FOREIGN PATENT DOCUMENTS

WO    2015116088 A1    8/2015

OTHER PUBLICATIONS

Carbone, et al., "Cutty: Aggregate Sharing for User-Defined Windows", In Proceedings of the 25th ACM International on Conference on Information and Knowledge Management, Oct. 24, 2016, pp. 1201-1210.
Carbone, et al., "Stream Window Aggregation Semantics and Optimization", Published in Encyclopedia of Big Data Technologies, 2019, 11 Pages.

(Continued)

*Primary Examiner* — Chelcie L Daye
(74) *Attorney, Agent, or Firm* — Fiala & Weaver P.L.L.C.

(57) ABSTRACT

Methods, systems, apparatuses, and computer program products are provided for determining a query plan. A query is received that comprises a request for a data result for each of a plurality of original time windows. The plurality of original time windows included in the query are identified. An initial window representation is generated that identifies a set of connections between windows in a window set that includes at least the original time windows. A revised window representation is generated that includes an alternative set of connections between windows in the window set based at least on an execution cost for at least one window. The revised window representation is selected to obtain the data result for each of the plurality of original time windows. A revised query plan based on the revised window representation is provided to obtain the data result for each of the plurality of original time windows.

20 Claims, 9 Drawing Sheets

(56) References Cited

OTHER PUBLICATIONS

Chandramouli, et al., "Trill: A high-performance incremental query processor for diverse analytics", In Proceedings of the VLDB Endowment vol. 8, Issue 4, Dec. 2014, pp. 401-412.
Krishnamurthy, et al., "On-the-fly Sharing for Streamed Aggregation", In Proceedings of the ACM SIGMOD International Conference on Management of data, Jun. 27, 2006, pp. 623-634.
Tangwongsan, et al., "General Incremental Sliding-Window Aggregation", In Proceedings of the VLDB Endowment, vol. 8, Issue 7, Feb. 2015, pp. 702-713.
"Amazon Kinesis", Retrieved from: https://aws.amazon.com/kinesis/, Retrieved on Feb. 7, 2020, 9 Pages.
"Azure Stream Analytics", Retrieved From: https://azure.microsoft.com/en-us/services/stream-analytics/, Retrieved on Feb. 7, 2020, 8 Pages.
"Google Cloud Dataflow", Retrieved from: https://cloud.google.com/dataflow/, Retrieved on Feb. 7, 2020, 22 Pages.
Akidau, et al., "MillWheel: Fault-Tolerant Stream Processing at Internet Scale", In Proceedings of the Very Large Data Bases Endowment, vol. 6, Issue 11, Aug. 27, 2013, pp. 1033-1044.
Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, No. 12, Aug. 2015, pp. 1792-1803.
Arasu, et al., "The CQL Continuous Query Language: Semantic Foundations and Query Execution", In International Journal on Very Large Data Bases, vol. 15, Issue 2, Jun. 1, 2006, 32 Pages.
Armbrust, et al., "Structured Streaming: A Declarative API for Real-Time Applications in Apache Spark", In Proceedings of the International Conference on Management of Data, Jun. 10, 2018, pp. 601-613.
Avnur, et al., "Eddies: Continuously Adaptive Query Processing", In Proceedings of the ACM SIGMOD International Conference on Management of Data, May 16, 2000, 12 Pages.
Ayad, et al., "Static Optimization of Conjunctive Queries with Sliding Windows Over Infinite Streams", In Proceedings of the ACM SIGMOD international conference on Management of Data, Jun. 13, 2004, 12 Pages.
Barga, et al., "Consistent Streaming Through Time: A Vision for Event Stream Processing", In Proceedings of the 3rd Biennial Conference on Innovative Data Systems Research, Jan. 7, 2007, pp. 363-374.
Bernstein, et al., "Serverless Event-Stream Processing over Virtual Actors", In Proceedings of the 9th Biennial Conference on Innovative Data Systems Research, Jan. 13, 2019, 2 Pages.
Byrka, et al., "An Improved LP-Based Approximation for Steiner Tree", In Proceedings of the 42nd ACM Symposium on Theory of Computing, Jun. 5, 2010, pp. 583-592.
Carbone, et al., "Apache Flink™: Stream and Batch Processing in a Single Engine", In Bulletin of the IEEE Computer Society Technical Committee on Data Engineering, vol. 36, Issue 4, Dec. 2015, pp. 28-38.
Chandramouli, et al., "Accurate Latency Estimation in a Distributed Event Processing System", In Proceedings of the IEEE 27th International Conference on Data Engineering, Apr. 11, 2011, 12 Pages.
Chandramouli, et al., "Quill: Efficient, Transferable, and Rich Analytics at Scale", In Proceedings of the Very Large Data Bases Endowment, vol. 9, Issue 14, Oct. 2016, pp. 1623-1634.
Deshpande, et al., "Lifting the Burden of History from Adaptive Query Processing", In Proceedings of the 30th International Conference on Very Large Data Bases, vol. 30, Aug. 31, 2004, pp. 948-959.
Floratou, et al., "Dhalion: Self-Regulating Stream Processing in Heron", In Proceedings of the Very Large Data Bases Endowment, vol. 10, Issue 12, Aug. 1, 2017, pp. 1825-1836.
Gray, et al., "Data Cube: A Relational Aggregation Operator Generalizing Group-By, Cross-Tab, and Sub Totals", In Journal of Data Mining and Knowledge Discovery, vol. 1, No. 1, Mar. 1, 1997, pp. 29-53.
Hirzel, et al., "A Catalog of Stream Processing Optimizations", In ACM Computing Surveys, vol. 46, No. 4, Mar. 1, 2014, 34 Pages.
Karimov, et al., "Benchmarking Distributed Stream Data Processing Systems", In Proceedings of IEEE 34th International Conference on Data Engineering, Apr. 16, 2008, 12 Pages.
Karp, Richard M., "Reducibility Among Combinatorial Problems", In Complexity of Computer Computation, 1972, pp. 85-103.
Li, et al., "No Pane, No Gain: Efficient Evaluation of Sliding-Window Aggregates Over Data Streams", In ACM SIGMOD Record, vol. 34, Issue 1, Mar. 1, 2005, pp. 39-44.
Li, et al., "Semantics and Evaluation Techniques for Window Aggregates in Data Streams", In Proceedings of the ACM SIGMOD International Conference on Management of Data, Jun. 14, 2005, pp. 311-322.
Mai, et al., "Chi: A Scalable and Programmable Control Plane for Distributed Stream Processing Systems", In Proceedings of the Very Large Data Bases Endowment, vol. 11, Issue 10, Jun. 1, 2018, pp. 1303-1316.
Nehme, et al., "Multi-Route Query Processing and Optimization", In Journal of Computer and System Sciences, vol. 79, Issue 3, May 1, 2013, pp. 312-329.
Nehme, et al., "Self-Tuning Query Mesh for Adaptive Multi-Route Query Processing", In Proceedings of the 12th International Conference on Extending Database Technology: Advances in Database Technology, Mar. 24, 2009, pp. 803-814.
Raman, et al., "Using State Modules for Adaptive Query Processing", In Proceedings of the 19th International Conference on Data Engineering, Mar. 5, 2003, 12 Pages.
Robins, et al., "Improved Steiner Tree Approximation in Graphs", In Proceedings of the 11th Annual ACM-SIAM Symposium on Discrete Algorithms, Jan. 9, 2000, 11 Pages.
Selinger, et al., "Access Path Selection in a Relational Database Management System", In Proceedings of the ACM SIGMOD International Conference on Management of Data, May 30, 1979, pp. 23-34.
Toshniwal, et al., "Storm@twitter", In Proceedings of the ACM SIGMOD International Conference on Management of Data, Jun. 22, 2014, pp. 147-156.
Traub, et al., "Efficient Window Aggregation with General Stream Slicing", In Proceedings of 22nd International Conference on Extending Database Technology, Mar. 26, 2019, pp. 97-108.
Venkataraman, et al., "Drizzle: Fast and Adaptable Stream Processing at Scale", In Proceedings of the 26th Symposium on Operating Systems Principles, Oct. 28, 2017, pp. 374-389.
Viglas, et al., "Rate-Based Query Optimization for Streaming Information Sources", In Proceedings of the ACM SIGMOD International Conference on Management of Data, Jun. 4, 2002, 13 Pages.
Zaharia, et al., "Discretized Streams: Fault-Tolerant Streaming Computation at Scale", In Proceedings of ACM SIGOPS 24th Symposium on Operating Systems Principles, Nov. 3, 2013, pp. 423-438.
"International Search Report and Written Opinion Issued in PCT Application No. PCT/US21/028531", dated Aug. 10, 2021, 10 Pages.

\* cited by examiner

400

500

600

700

Original Plan

Revised Plan

800

900

(a) Window partitioning  (b) Window coverage

1000

(a) First Basic Pattern   (b) Second Basic Pattern (a) Dependent   (b) Independent

OPTIMIZING AGGREGATES OVER CORRELATED WINDOWS IN A STREAM-QUERY SYSTEM

BACKGROUND

Near-real-time querying of data streams is utilized by many applications and across many industries. Often times, such querying includes a streaming query that collects and aggregates data for a window of the data stream (e.g., values aggregated over the same data stream for a specified period of time). In some instances, users may even want to perform the same aggregate function over the same data stream but with windows of different sizes. Different size windows may be utilized for a variety of reasons, such as to learn about or debug a stream by exploring its behavior over different time periods, reporting near real-time behavior of a data stream over small windows as well as much longer windows (e.g., an hour vs. a week), and supporting different users whose dashboards display stream behavior over different window sizes.

Data stream processing has been growing recently due to the surge of demand for Internet of Things (IoT) and edge computing, which has led to a variety of systems from both the open-source community and commercial industry to process streaming queries. However, despite the increased demand for stream query processing, execution of queries that aggregate data over time windows has not been optimal. For instance, in many systems, an aggregate function of a streaming query may be executed simply by evaluating the aggregate function over each individual window separately. Although such a solution can be implemented relatively easily, execution of the query in this manner performs unnecessary processing, thereby wasting central processing unit (CPU) cycles.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for determining a query plan. A query is received that comprises a request for a data result for each of a plurality of original time windows. The plurality of original time windows included in the query are identified. An initial window representation is generated that identifies a set of connections between windows in a window set that includes at least the original time windows. A revised window representation is generated that includes an alternative set of connections between windows in the window set based at least on an execution cost for at least one window. The revised window representation is selected to obtain the data result for each of the plurality of original time windows. A revised query plan based on the revised window representation is provided to obtain the data result for each of the plurality of original time windows.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
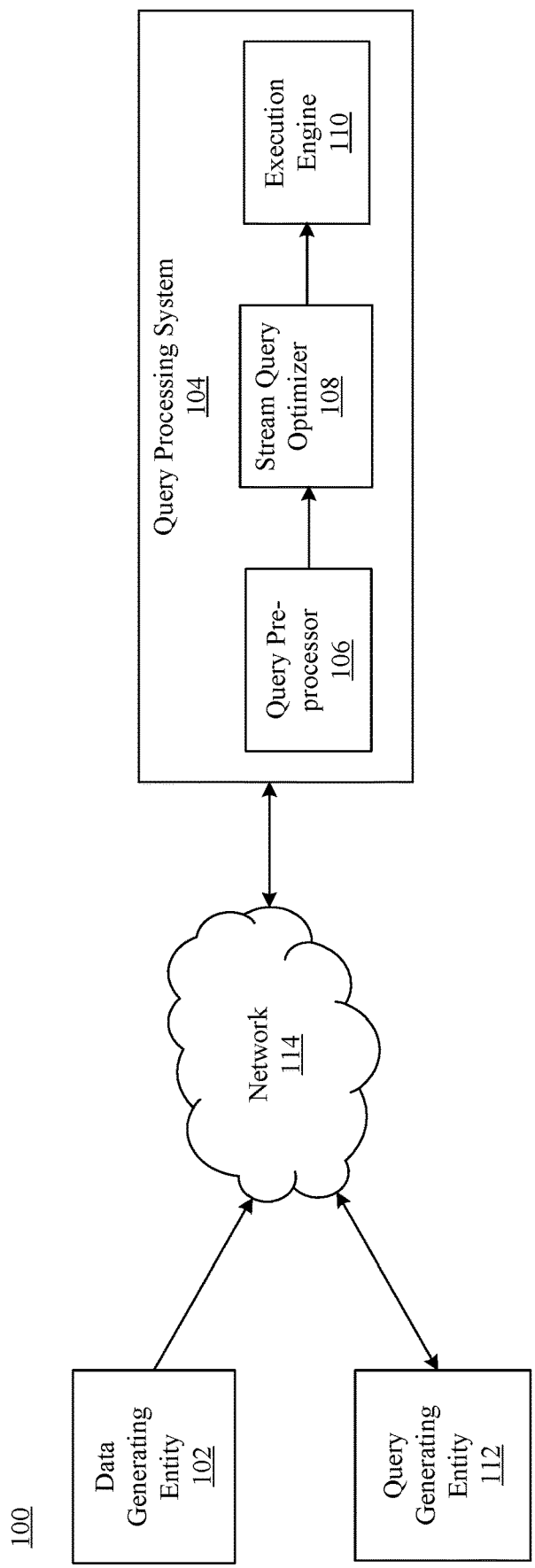
FIG. 1 shows a block diagram of a system for obtaining a data result for a streaming query, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. EXAMPLE IMPLEMENTATIONS

Near-real-time querying of data streams is utilized by many applications and across many industries. Often times, such querying includes a streaming query that collects and aggregates data for a window of the data stream (e.g., values aggregated over the same data stream for a specified period of time). In some instances, users may even want to perform the same aggregate function over the same data stream but with windows of different sizes. Different size windows may be utilized for a variety of reasons, such as to learn about or debug a stream by exploring its behavior over different time periods, reporting near real-time behavior of a data stream over small windows as well as much longer windows (e.g., an hour vs. a week), and supporting different users whose dashboards display stream behavior over different window sizes.

Data stream processing has been growing recently due to the surge of demand for IoT and edge computing, which has led to a variety of systems from both the open-source community and commercial industry to process streaming queries. However, despite the increased demand for stream query processing, execution of queries that aggregate data over time windows has not been optimal. For instance, in many systems, an aggregate function of a streaming query may be executed simply by evaluating the aggregate function over each individual window separately. Although such a solution can be implemented relatively easily, execution of the query in this manner performs unnecessary processing, thereby wasting central processing unit (CPU) cycles.

Embodiments described herein address these and other issues by providing a system for determining a query plan for a query, such as a streaming query. In an example system, a window representation generator identifies a plurality of original time windows included in a query, where the query comprises a request for a data result for each of the plurality of original time windows. The window representation generator generates an initial window representation that identifies a set of connections between windows in a window set that includes at least the original time windows, and generates a revised window representation that includes an alternative set of connections between windows in the window set. The revised window representation is generated based at least on an execution cost for at least one of the windows. A query plan selector selects the revised window representation, and provides a revised query plan based on the revised window representation to obtain the data result for each of the plurality of original time windows.

Determining a query plan for a query in this manner has numerous advantages, including reducing the resources utilized to execute a query. For instance, where a query is received to perform the same aggregate function over the same data stream but with windows of different sizes, prior techniques may execute each aggregate function over each window independent of the other windows, which can utilize a relatively large number of processor cycles and consume a relatively large amount of memory. With implementation of the techniques described herein, overlaps between time windows specified by the query can be identified to generate an alternative query plan that may reduce an execution cost. As an illustration, if an original query sought an aggregate output (e.g., a minimum, or MIN, function) over both a 10-minute and 20-minute window, prior techniques may generate results for the 10-minute and 20-minute windows independent of each other. Techniques described herein may identify an overlapping relationship between the windows and identify an alternative query plan in which the 20-minute window can be computed from two consecutive outputs of the 10-minute window. Since the 20-minute window can be computed directly from the 10-minute window, instead of separately from the input stream, results for the 20 minute window can be computed in a manner that has a reduced overall number of processing cycles, as well as reducing the amount of memory utilized (e.g., by virtue of not re-computing and/or storing results that may be shared by another window in the query).

Further, because redundant computation may be reduced when producing query results responsive to a streaming query, techniques described herein may improve an overall efficiency in producing query results. For instance, since processing cycles and memory usage may be reduced, execution of a streaming query may be carried out faster (e.g., reduce the query execution latency) in many instances, thereby improving the executions of streaming queries overall.

Example embodiments are described as follows for systems and methods for generating a query plan for a query. For instance, FIG. 1 shows a block diagram of a system 100 for obtaining a data result for a streaming query. As shown in FIG. 1, system 100 includes a data generating entity 102, a query processing system 104, and a query generating entity 112, each of which is coupled via a network 114. As further shown in FIG. 1, query processing system 104 includes a query pre-processor 106, a stream query optimizer 108, and an execution engine 110. It is noted that system 100 is described herein merely by way of example only. Persons skilled in the relevant art(s) will readily appreciate that techniques for generating a query plan for a query can be implemented in a wide variety of systems other than system 100 of FIG. 1. For instance, system 100 may comprise any number of entities (e.g., computing devices and/or servers or other entities), including those illustrated in FIG. 1 and optionally one or more further devices not expressly illustrated, coupled in any manner. Additionally, although data generating entity 102, query processing system 104, and query generating entity 112 are shown separate from each other, any one or more of such components (or subcomponents) may be co-located, located remote from each other, may be implemented on a single computing device or server, or may be implemented on or distributed across one or more additional computing devices not expressly illustrated in FIG. 1. System 100 is further described as follows.

Network 114 may include one or more of any of a local area network (LAN), a wide area network (WAN), a personal area network (PAN), a combination of communication networks, such as the Internet, and/or a virtual network. In an implementation, any one or more of data generating entity 102, query processing system 104, and query generating entity 112 may communicate via one or more application programming interfaces (API), network calls, and/or according to other interfaces and/or techniques. Data generating entity 102, query processing system 104, and query generating entity 112 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Each of the above components will now be described in more detail.

Query generating entity 112 may comprise a device, a computer program, or some other hardware-based or software-based entity that is capable of generating a query to obtain data results, such as a streaming query to obtain a data result from a data stream. In implementations, the data stream may comprise a stream of data from query data generating entity 102, as described in further detail below. For instance, data generating entity 102 may comprise any type of entity that may continuously generate values and/or generate values over any period of time, such as a sensor, monitor, IoT device, etc., and may be part of any application or industry, such as network and/or computing system monitoring, industrial and/or commercial equipment, manufacturing, financial services (e.g., algorithmic trading), business operations, fraud detection, process monitoring, event processing, etc. In one embodiment, query generating entity 112 provides a user interface by which a user thereof can submit the query, such as a query that identifies a data stream, one or more time intervals, and an aggregate function to perform operations on data received from the data stream for each time window.

In another embodiment, query generating entity 112 is capable of automatically generating the query. For instance, query generating entity 112 may comprise a user interface through which a user may select a data stream, or more time windows, and an aggregate function to perform for each time window on the data stream, and query generating entity 112 may automatically generate one more queries to carry out the user's selections. Still other techniques for generating the query may be implemented by query generating entity 112. The query generated by query generating entity 112 may be represented using Structured Query Language (SQL) or any other language (e.g., declarative query languages) depending upon the implementation.

In some implementations, query generating entity 112 may include any computing device of one or more users (e.g., individual users, family users, enterprise users, governmental users, etc.) that may comprise one or more applications, operating systems, virtual machines, storage devices, etc. that may be used to generate a query to obtain results for a stream of data, such as data generating entity 102. Query generating entity 112 may include any number of programs or computing devices, including tens, hundreds, thousands, millions, or even greater numbers. In examples, query generating entity 112 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Query generating entity 112 is not limited to a physical machine, but may include other types of machines or nodes, such as a virtual machine. Query generating entity 112 may interface with query processing system 104 through APIs and/or by other mechanisms. Note that any number of program interfaces may be present.

Query generating entity 112 is communicatively connected to query processing system 104 and is operable to submit the query thereto. In one embodiment, query processing system 104 comprises a software-implemented system executing on one or more computers or server devices. In some implementations, query processing system 104 may comprise a collection of cloud-based computing resources or servers that may provide cloud-based services for a plurality of clients, tenants, organizations, etc. Generally speaking, query processing system 104 is configured to receive the query from query generating entity 112, to execute the query against to obtain results from data generating entity 102 and/or process the results (e.g., perform an aggregate or other computation on the results) responsive to the query, and to return the processed results to query generating entity 112 or some other consumer of the processed results. In one example embodiment, query processing system 104 comprises a version of SQL SERVER®, published by Microsoft Corporation of Redmond, Washington. However, this example is not intended to be limiting, and may include other programs, software packages, services, etc. for executing a query from query generating entity 112 and providing the results of the query back to query generating entity 112.

Query pre-processor 106 is configured to receive, parse, and/or compile the query submitted by query generating entity 112. For instance, query pre-processor 106 may perform certain operations on the obtained query to generate a representation of the query that is suitable for further processing by stream query optimizer 108. Such operations may include but are not limited to one or more of query normalization, query binding, and query validation. In an embodiment, query pre-processor 106 outputs a logical operator representation of the query that identifies one or more time windows and/or aggregate operators for each time window. In further accordance with such an embodiment, the logical operator representation of the query may comprise a logical operator tree. As described herein, a logical operator representation may be obtained by translating the original query text generated by query generating entity 112 into a tree or other hierarchical structure with a root-level operator, one or more leaf nodes representing inputs and internal nodes representing relational operators. This is only illustrative, and other techniques may be implemented by query pre-processor 106 in embodiments.

Stream query optimizer 108 is configured to receive the logical operator representation of the query output by query pre-processor 106 and automatically process such representation to determine a query plan for executing the query. A query plan may represent an efficient execution strategy for the query, such as a strategy for executing the query in a manner that conserves processing and/or memory resources. Generally speaking, stream query optimizer 108 operates to generate a query plan for the query by identifying computations among windows in the query that may be shared. As described herein, the query may specify at least a data stream, a plurality of time windows, and an aggregate function to perform on the data stream for each time window. Stream query optimizer 108 may be configured to identify a plurality of original time windows included in a query. Based on the original time windows, stream query optimizer 108 may generate an initial window representation that identifies a set of connections between windows in a window set that includes at least the original time windows. Each connection may identify one or more relationships between other windows in the window set. For instance, each connection may indicate a possible source of data from which an aggregate function for each window may be computed. Stream query optimizer 108 may also generate one or more revised window representations that includes an alternative set of connections, such as by removing a connection from the initial window representation based at least on an execution cost of at least one of the windows. For instance, a revised window representation may indicate that a particular downstream time window can be computed from an upstream window, instead of being computed directly from an output of the data stream. In examples, stream query optimizer 108 may select the window representation with a reduced execution cost. Further details regarding the operation of stream query optimizer 108 will be described herein.

Once stream query optimizer 108 has generated and determined a query plan for the query, stream query optimizer 108 may provide the query plan for generating a revised query which may be executed by execution engine 110. Execution engine 110 is configured to carry out execution of the revised query based on the query plan determined by stream query optimizer 108 to obtain the data result for each of the plurality of time windows specified in the original query. In examples, execution engine 110 may obtain data values from data generating entity 102 and process the data values based on the query plan (e.g., to perform one or more aggregate functions for each of a plurality of time windows). Execution engine 110 may also be configured to perform any other processing operations on the obtained data, such as data manipulation operations or any other calculation operations that may be specified by the revised query. Once execution engine 110 has generated data results that satisfies the revised query, execution engine 110 returns the query results to query generating entity 112.

As noted above, query processing system 104 may be implemented on one or more computers. For example, query pre-processor 106, stream query optimizer 108, and execution engine 110, or some sub-combination thereof, may be implemented on the same computer. Alternatively, each of query pre-processor 106, stream query optimizer 108 and execution engine 110 may be implemented on different computers. Still further, each of query pre-processor 106, stream query optimizer 108 and execution engine 110 may be implemented using multiple computers. For example, a distributed computing approach (e.g., in a cloud computing environment) may be used to enable the functions of stream query optimizer 108 and/or execution engine 110 to be performed in parallel by multiple computers. Still other implementations may be used.

In one embodiment, data generating entity 102, query generating entity 112 and some or all of the components of query processing system 104 may be on the same computer. In accordance with such an embodiment, the query generated by query generating entity 112 may be provided to query processing system 104 via a communication channel that is internal to the computer. In an alternate embodiment, query generating entity 112 is implemented on a device that is separate from the computer(s) used to implement query processing system 104.

Figure 2:
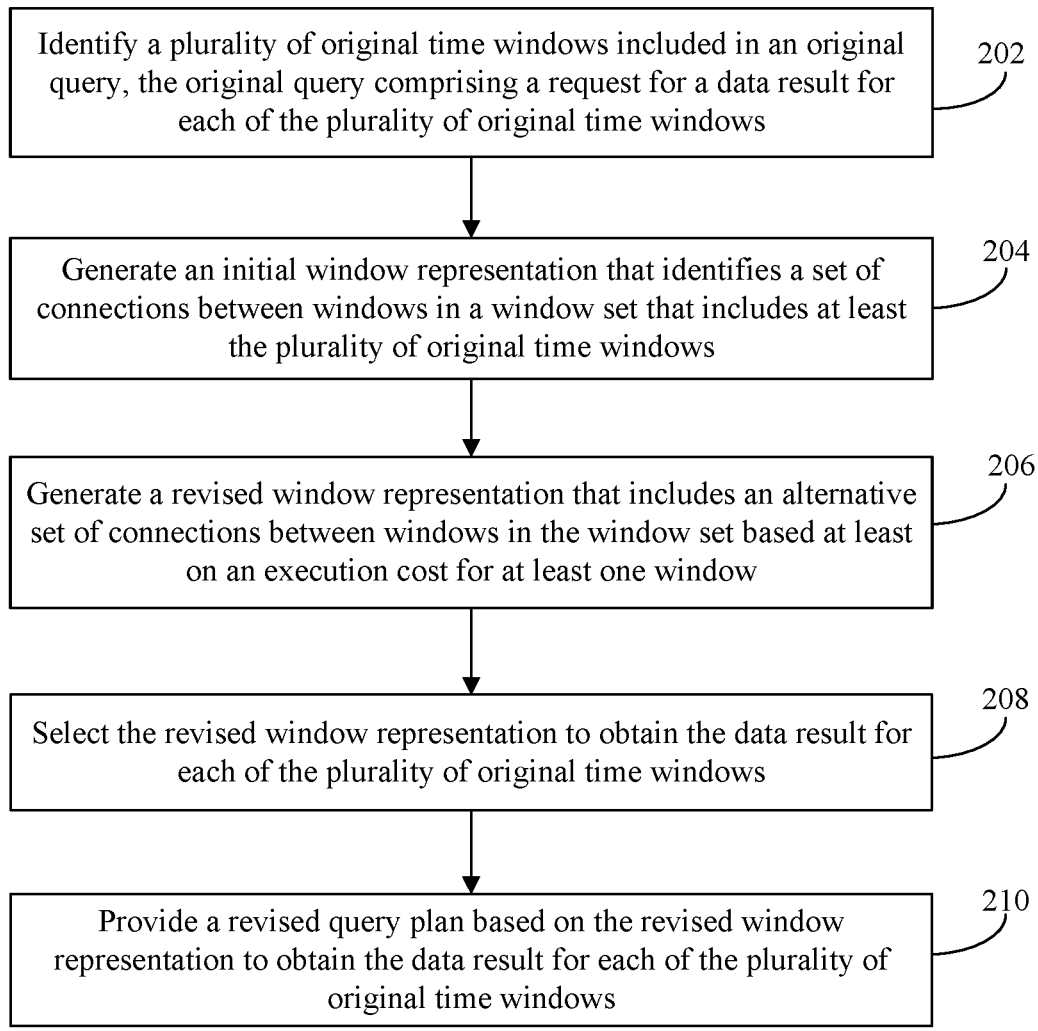
FIG. 2 shows a flowchart of a method for determining a query plan for a query, according to an example embodiment.

Stream query optimizer 108 may operate in various ways to determine a query plan for a query to be executed. For instance, stream query optimizer 108 may operate according to FIG. 2. FIG. 2 shows a flowchart of a method for determining a query plan for a query, according to an example embodiment. For illustrative purposes, flowchart 200 and stream query optimizer 108 are described as follows with respect to FIG. 3.

Figure 3:
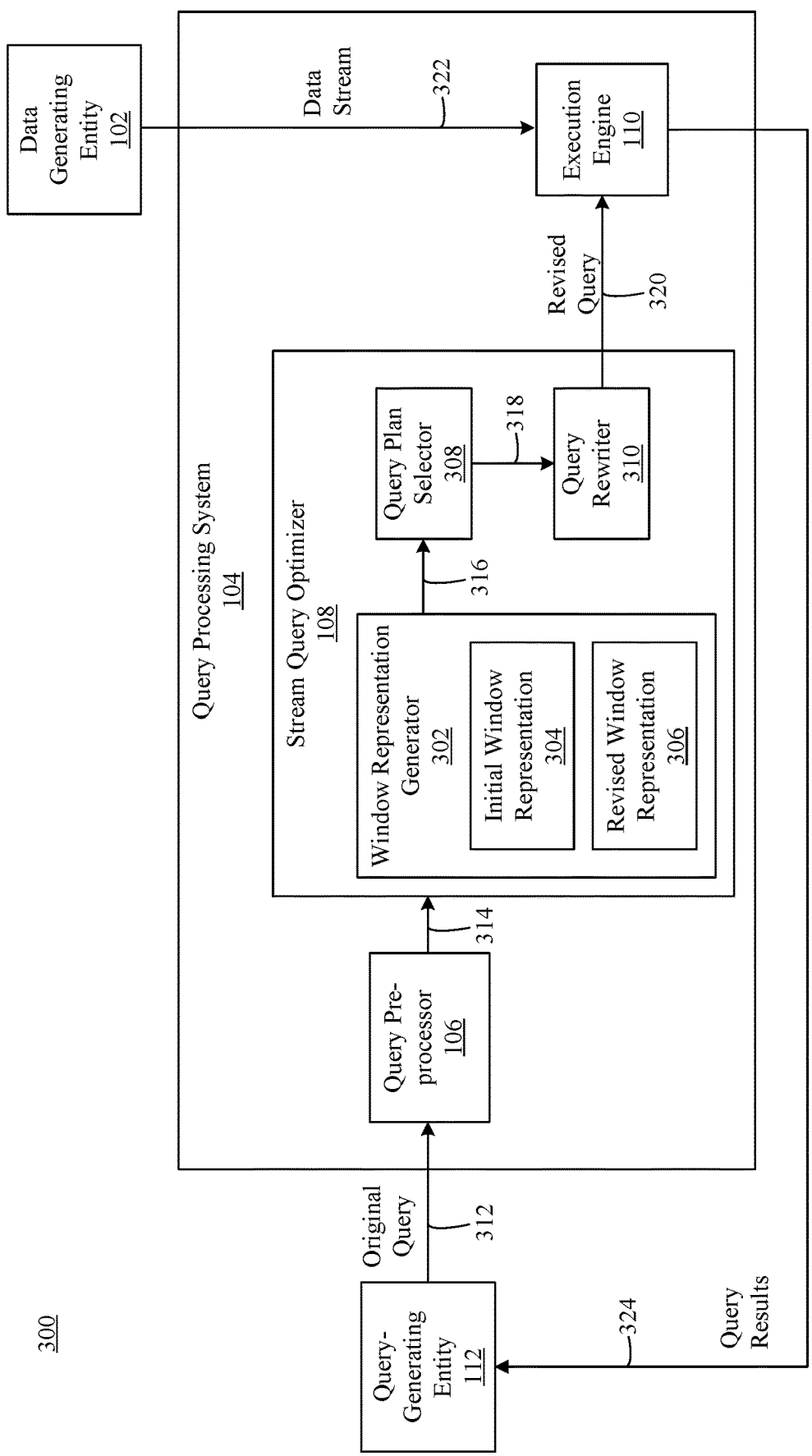
FIG. 3 shows a block diagram of a system for selecting a query plan for a streaming query, according to an example embodiment.

FIG. 3 shows a block diagram of a system for selecting a query plan for a streaming query, according to an example embodiment. As shown in FIG. 3, system 300 includes an example implementation of data generating entity 102, query processing system 104, query pre-processor 106, stream query optimizer 108, execution engine 110, and query-generating entity 112. Stream query optimizer 108 includes a window representation generator 302, a query plan selector 308, and a query rewriter 310. As illustrated in FIG. 3, window representation generator 302 includes an initial window representation 304 and a revised window representation 306. Flowchart 200 and system 300 are described in further detail as follows.

Flowchart 200 of FIG. 2 begins with step 202. In step 202, a plurality of original time windows included in an original query are identified, where the original query comprises a request for a data result for each of the plurality of original time windows. For instance, with reference to FIG. 3, query generating entity 112 may generate 312 an original query (e.g., manually and/or automatically, as described herein) that is provided to query processing system 104. The query received by query processing system 104 may be a streaming query, such as a query to obtain a data result from data generating entity that may generate data values over time. In examples, the query to be executed by query processing system 104 may comprise a request to compute a data result for each of a plurality of original time windows. As one non-limiting illustration, the requested data result may comprise an aggregation of a data stream over each of the plurality of time windows. For instance, the aggregation may be a computation (e.g., a MIN or MAX function) to be performed over multiple windows that may be correlated from the same event stream (e.g., an event stream from data generating entity 102), such as an aggregate function for a 10-minute window, a 20-minute window, a 30-minute window, and a 40-minute window, all from the same data stream. An example query that may be received by query processing system 104 is described below in Section III.

This example is only illustrative, and it is contemplated that any other streaming query may be generated by query generating entity 112 and provided to query processing system 104.

Query pre-processor 106 may perform one or more pre-processing operations on the original query, including but not limited to generating a logical operator tree for the original query, as described above. In examples, window representation generator 302 may receive 314 an output from the query pre-processor 106, such as the logical operator tree or any other representation of the query and/or the original query, and identify a plurality of original time windows included in the original query. For instance, window representation generator 302 may identify, from the output of the query pre-processor 106, a set of window definitions, each of which identify a time window over which a computation is to be performed, along with a set of one or more computations (e.g., an aggregate function) to be performed for each time window.

In step 204, an initial window representation is generated that identifies a set of connections between windows in a window set that includes at least the plurality of original time windows. For instance, with reference to FIG. 3, window representation generator 302 is configured to generate initial window representation 304 that identifies a set of connections between a window in a window set that includes at least the plurality of original time windows. Initial window representation 304 may comprise any type of representation (e.g., a tree structure comprising a plurality of nodes) that illustrates one or more relationships between any of the plurality of original time windows. In other words, each connection between windows in the window set may describe relationships (e.g., overlapping relationships) between the windows and/or how each window in the window set can be computed using an output from one or more other windows in the window set. In implementations, the connections may describe each possible data flow between windows in the window set to compute the aggregations defined in the query. As used herein, a window set may comprise at least the set of window sizes over which an aggregate is to be computed. As will be described in greater detail below, a window set may also include one or more auxiliary windows that can be used to further improve processing efficiencies in some instances.

For instance, initial window representation 304 may indicate, for each window in the window set, an input to the window that may be used to compute the data result for that window, and an output from the window. In some scenarios, the input to a given window in the window set may be an input data stream (e.g., a data stream received directly from data generating entity 102). In other scenarios, the input to a given window may be a computed data result for another window in the set of windows. For instance, instead of computing the data result for a given window directly from the data stream, the data result can be computed based on the computed data result of another window in the window set (e.g., over a plurality of consecutive intervals of the other window). Similarly, the computed data result for a given window may be output for use in computing a data result for another window in the window set in some examples.

It is also contemplated that an initial window representation may contain any number of inputs and/or outputs for a given window in the window set. For instance, initial window representation 304 may indicate more than one input and/or output connection for a given window, such that the initial window representation may identify a plurality of possible options for computing a data result for each individual window in the window set.

As an illustration, initial window representation 304 may indicate that a downstream window (e.g., a 20-minute window) may be computed from an upstream window (e.g., a 10-minute window) that has an overlapping relationship and/or directly from a data stream of data generating entity 102. This example is only illustrative, and it is contemplated that any other window sizes may be present. Sections III.B and III.C below provide additional details regarding generation of a window representation (also referred to herein as a window coverage graph).

In step 206, a revised window representation is generated that includes an alternative set of connections between windows in the window set based at least on an execution cost for at least one window. For instance, with reference to FIG. 3, window representation generator 302 may generate revised window representation 306 that includes an alternative set of connections between windows in the window set (e.g., a different set of connections than revised window representation 304). In implementations, the revised window representation 306 may be generated based at least on an execution cost for at least one of the windows in the window set.

For instance, as described above, initial window representation 304 may identify, for a given window, a plurality of possible connections (e.g., relationships or data flows) between other windows in the window set. As an illustration, initial window representation 304 may indicate that a downstream window (e.g., a 20-minute window) may be generated with multiple possible inputs, such as an upstream 10-minute window and directly from the data stream (e.g., data generating entity 102). In such an example, window representation generator 302 may determine a separate execution cost for a window using each possible input. In other words, in this illustration, the window representation generator 302 may identify a first execution cost for the downstream 20-minute window that uses an output of an upstream 10-minute window as an input, and a second execution cost for the same downstream 20-minute window that uses an output of the data stream received from data generating entity 102. Such a process may be performed for each window in the set of windows that contains multiple connections (e.g., each downstream window that can perform an aggregate function with different input windows or data flows).

Based at least on the determined execution costs, window representation generator 302 may alter initial window representation 304 to generate revised window representation 306 that includes an alternative set of connections in revised window representation 306. In examples, the alternative set of connections may reflect a removal of one or more connections from initial window representation 304 that did not contribute to a minimum overall execution cost (e.g., sub-optimal connections). For instance, revised window representation 306 may comprise a representation that may be similar to initial window representation 304, but includes connections that are estimated to lead to a reduction in execution cost. In other words, where initial window representation 304 may identify each possible data flow for one or more windows in the window set, revised window representation 306 may be a simplified representation in which certain connections between windows that are determined to result in a higher execution cost are removed. In examples, revised window representation 306 may remove one or more connections between pairs of windows such that only a single input for each downstream window in the window set remains. Further details and examples regarding generation of revised window representation 306 are provided below, including but not limited to in Sections III.B, and III.D).

Execution costs for computing an aggregate for a given window may be estimated in various ways. For instance, execution costs for a window may be estimated based on application of one or more cost models, such as a machine-learning model or any other suitable model. Further, it is understood and appreciated that execution costs are not limited to any particular type of cost, but may include any type of resource consumption estimate, such as an estimate of the time required to compute a result, an estimate of an amount of system resources (e.g., processing cycles, communication bandwidth, memory, or the like), an estimate of some other aspect associated with computing a result for a window, or some combination thereof.

In step 208, the revised window representation is selected to obtain the data result for each of the plurality of original time windows. For instance, with reference to FIG. 3, query plan selector 308 may be configured to select 316 revised window representation 306 to obtain the data result for each of the plurality of original time windows. In other words, rather than selecting an unmodified query representation based on the original query generated by query generating entity 112, query plan selector 308 may select an alternative representation (i.e., revised window representation) to use to obtain the requested data result (e.g., an aggregation) across the same plurality of time windows identified in original query. In this manner, query plan selector 308 may be configured to select a window representation that is better optimized than a representation generated from the original query, thereby leading to improvements when an execution engine obtains and processes the requested results.

In step 210, a revised query plan based on the revised window representation is provided to obtain the data result for each of the plurality of original time windows. For instance, with reference to FIG. 3, query plan selector 308 may be configured to provide 318 a revised query plan based on the selected revised window representation 306 to obtain the data result for each of the plurality of original time windows (i.e., the time windows identified in the original query). In examples, the revised query plan may be represented in any suitable format for indicating a manner in which execution engine 110 should obtain data results to return to query generating entity. For instance, the revised query plan may comprise revised window representation 306 and/or may be generated from revised window representation 306, or may comprise any other representation based on revised window representation 306.

In some example implementations, query plan selector 308 may provide the revised query plan to query rewriter 310. Query rewriter 310 may comprise one or more algorithms or other processes for generating a revised query based on the revised query plan, where the revised query indicates how execution engine 110 should obtain and/or process results to return to query generating entity 112. Further details regarding techniques for rewriting a query in accordance with example embodiments are described in greater detail below in Section III.C.3.

Upon generation of a revised query, the revised query may be provided 320 to execution engine 110 to execute the revised query. Execution engine 110 may execute the revised query by obtaining 322 a data stream from data generating entity 102, processing the obtained data according to the revised query, and returning 324 a data result for each of a plurality of original time windows as specified in the original query to query generating entity 112.

Thus, in accordance with techniques described herein, where query generating entity 112 generates a query in which an aggregate is requested to be computed across several different time windows, execution engine 110 need not compute the aggregation for a given window independent of other windows in the query. Rather, as disclosed herein, stream query optimizer 108 may automatically (i.e., without further input from a user following generation of the original query) identify which windows of a window set may serve as an input to other windows in the window sets, thereby allowing partial aggregates computed by an upstream window to be used by other downstream windows (e.g., using two consecutive outputs of a 10-minute window to compute a 20-minute window, or using two consecutive outputs of a 20-minute window to compute a 40-minute window). In this manner, execution engine 110 may execute a revised query that is better optimized than the original query due at least due to requiring a reduced a number of processing cycles and/or reduced memory utilization (e.g., by leveraging overlapping relationships between windows) in an automated fashion, while still providing the same requested query results to query generating entity 112 without impacting the user experience.

Figure 4:
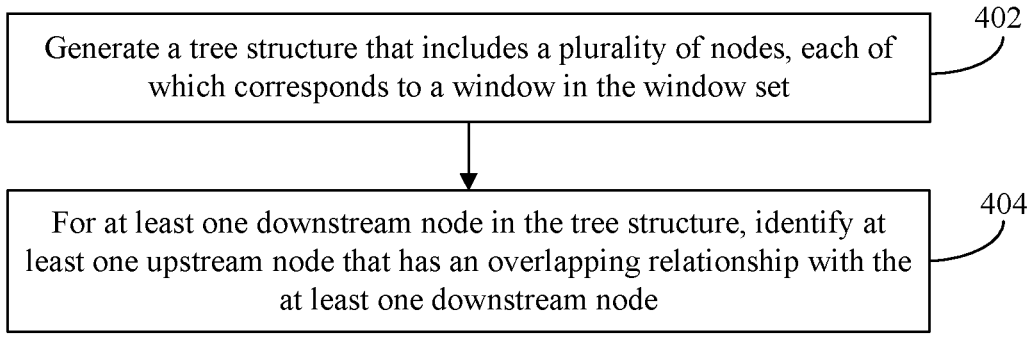
FIG. 4 shows a flowchart of a method for generating a tree structure for a window representation, according to an example embodiment.

As described above, window representation generator 302 may generate a window representation for a query in various ways. For instance, FIG. 4 shows a flowchart of a method for generating a tree structure for a window representation, according to an example embodiment. In an implementation, the method of flowchart 400 may be implemented by window representation generator 302. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a tree structure is generated that includes a plurality of nodes, each of which corresponds to a window in the window set. For instance, with reference to FIG. 3, window representation generator 302 may generate a window representation (e.g., initial window representation 304 and/or revised window representation 306) as a tree structure that includes a plurality of nodes, each node corresponding to a window in the window set. The tree structure generated by window representation generator 302 may be any type of tree, including but limited to a graph, a hierarchy, or any other representation that may graphically describe relationships between nodes. In examples, nodes of the tree structure may include one or more upstream and/or downstream windows that correspond to windows of the window set, where one or more of the upstream windows may exhibit a relationship with one or more downstream nodes.

In step 402, for at least one downstream node in the tree structure, at least one upstream node is identified that has an overlapping relationship with the at least one downstream node. For instance, with reference to FIG. 3, window representation generator 302 may identify, in the tree structure, one or more upstream nodes and one or more downstream nodes as described above. For at least one downstream node in the tree structure, window representation generator 302 may also identify at least one upstream node that has an overlapping relationship with the downstream node. For instance, for a given window (e.g., a downstream node) that may be computed using an output of another window (e.g., an upstream node), the tree structure may identify an overlapping relationship, such as by connecting the two nodes together in a child/parent relationship, or any other manner that may indicate a possible data flow between the two nodes.

In implementations, the overlapping relationship between an upstream node and a downstream node may comprise a mathematical relationship that may indicate that the downstream node may be computed from an output of the upstream node. For instance, in some examples, the overlapping relationship between at least one upstream node and at least one downstream node may exist if a time interval of the at least one upstream node is a factor (e.g. a mathematical factor) of the at least one downstream node. As an illustration, if an upstream node has a time interval of 10 minutes and a downstream node has a time interval of 20 minutes, the time interval of the upstream node may identified as having an overlapping relationship with the upstream node since 10 is a factor of 20 in this illustration. Further details regarding techniques for determining overlapping relationships are described elsewhere herein, including but not limited to Sections III.B, Section III.C, and Section III.D.

Figure 5:
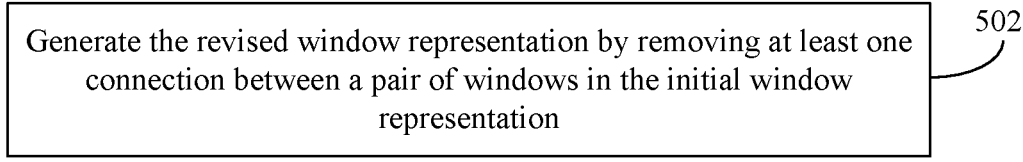
FIG. 5 shows a flowchart of a method for removing connections between a pair of windows in a window representation, according to an example embodiment.

As described above, window representation generator 302 may generate a revised window representation 306 in various ways. For instance, FIG. 5 shows a flowchart of a method for removing connections between a pair of windows in a window representation, according to an example embodiment. In an implementation, the method of flowchart 500 may be implemented by window representation generator 302. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a revised window representation is generated by removing at least one connection between a pair of windows in an initial window representation. For instance, with reference to FIG. 3, window representation generator 302 may generate revised window representation 306 by removing at least one connection between a pair of windows, such as by removing, for a downstream window that includes a connection to each of a plurality of upstream windows in initial window representation 302, at least one of the connections between the downstream window and the plurality of upstream windows. The removal of connection may be performed in various ways, as described herein. In one implementation, window representation generator 302 may be configured to remove any number of connections between pairs of upstream windows and downstream windows (e.g., removing one or more possible data flows between upstream windows and downstream windows) based on an estimated cost of computing the downstream windows.

For instance, as explained above, and in further detail below in Sections III.B and Section III.C, connections between nodes that may result in higher execution costs may be removed when generating revised window representation 306, such that revised window representation 306 identifies, for each window in the window set, an input connection from no more than one other window in the window set. In this manner, revised window representation 306 may identify, for each downstream window of a plurality of downstream windows in a window set, a connection to no more than one upstream window (e.g., the optimal upstream window for that particular downstream window) that may serve as the input for the downstream window. Stated differently, in some implementations, revised window representation 306 may be comprised of only those connections that contributed to the minimum overall cost of computing the aggregate functions in the original query such that an input for each downstream window is from only a single upstream window after removal of one or more connections between pairs of windows in the initial window representation.

As an illustration, if a query comprised an aggregate computation over a 10-minute window and a 20-minute window, initial window representation 304 may indicate that a downstream 20-minute window may be computed from two consecutive outputs of an upstream 10-minute window, as well as computed directly from the data stream from data generating entity 102. Thus, the downstream 20-minute window may have a first connection to the upstream 10-minute window, as well as a second connection to a data stream of data generating entity 102. In this illustration, it may be determined that the cost of computing the 20-minute window from the data stream comprises a greater cost than computing the 20-minute window from two consecutive outputs of the 10-minute window (since the 10-minute windows are already being computed). As a result, the connection between the data stream and the 20-minute window may be removed. It is understood that this example is illustrative only, and connections for any pair of windows may be removed in a similar manner to generate an optimized window representation that identifies, for each downstream window, one and only one input from an optimal upstream window.

Figure 6:
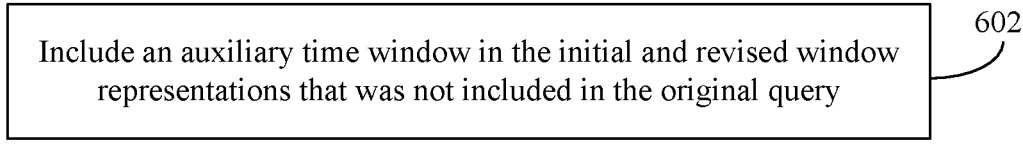
FIG. 6 shows a flowchart of a method for including an auxiliary time window in a window representation, according to an example embodiment.

In some example embodiments, the window set in a window representation may include windows that are not identified in an original user query. For instance, FIG. 6 shows a flowchart of a method for including an auxiliary time window in a window representation, according to an example embodiment. In an implementation, the method of flowchart 600 may be implemented by window representation generator 302. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, an auxiliary time window that was not included in the original query is included in the initial window representation and/or the revised window representation, where the auxiliary time window comprises a time interval that is a factor of a time interval of at least one of the plurality of original time windows. For instance, with reference to FIG. 3, window representation generator 302 may be configured to include an auxiliary time window in the initial window representation and/or the revised window representation that was not included in the original query received from query generating entity. Such an auxiliary window, also referred to as a "factor window" herein, may have a time interval that is a factor of a time interval of another window in the window set, such as one or more windows included in the query.

As described in greater detail below in Section III.D, an auxiliary time window may be determined for insertion in a window representation in various ways. For instance, a window set may comprise a plurality of time windows where none of the windows is a factor of another window. In such an example, an auxiliary window may be determined as comprising a time interval that is a factor of at least a plurality of the windows. As an illustration, if a window set comprises time intervals for 6-minute, 8-minute, and 10-minute windows, an auxiliary time window may be included in the set that has a time interval of 2-windows, and may be inserted as an upstream time interval that can provide an output to a downstream 6-minute, 8-minute, and 10-minute interval. In this example, because each of the aggregates for the downstream windows may be computed in a manner on an output of the 2-minute window (i.e., the computations of the 2-minute aggregate may be shared for a plurality of other windows in the window set), insertion of the auxiliary time window may reduce an overall computation cost, even if the window was not included in the original query generated by query generating entity 112. It is noted and understood that any number of auxiliary windows may be included in a window set, and is not limited to only adding a single auxiliary window.

In some further examples, one or more post-processing operations may be performed upon inserting an auxiliary time window in initial window representation 304 and/or revised window representation 306. For instance, since insertion of an auxiliary time window can add certain execution costs (e.g., since those windows were not part of the original query), window representation generator 302 may also be configured to perform a validation check to confirm that insertion of the auxiliary resulted in an overall cost reduction. If the auxiliary window was determined not to be beneficial from a cost standpoint, the auxiliary window may be removed from the window representation in some implementations.

Accordingly, using techniques described herein, window representation generator 302 may intelligently add one or more auxiliary time windows to the window set that were not included in the original query to improve optimization of the query. Further details with respect to the insertion of auxiliary or factor windows by window representation generator are described in greater detail below in at least Section III and the figures described therein.

III. ADDITIONAL EXAMPLE QUERY OPTIMIZER EMBODIMENTS

A. Introduction

The following sections are intended to describe additional example embodiments in which implementations described herein may be provided. Furthermore, the sections that follow explain additional context for such example embodiments, details relating to the implementations, and evaluations of such implementations. The sections that follow are intended to illustrate various aspects and/or benefits that may be achieved based on techniques described herein, and are not intended to be limiting. Accordingly, while additional example embodiments are described, it is understood that the features and evaluation results described below are not required in all implementations.

In example stream query optimizer embodiments, techniques may be implemented by one or more of data generating entity 102, query processing system 104, query preprocessor 106, stream query optimizer 108, execution 110, query generating entity 112, window representation generator 302, query plan selector 308, and/or query rewriter 310 (including any subcomponents thereof). Other structural and operational implementations will be apparent to persons skilled in the relevant art(s) based on the following discussion.

An example is described below in which certain benefits and advantages may be achieved with implementation of one or more of the techniques described herein.

Example 1 (Multi-window aggregate query): A sample query is provided below in which a single aggregate function (i.e., MIN) is computed over multiple windows. In the sample query, the minimum temperature reported by each device is to be reported every 10, 20, 30, and 40 minutes:

```
SELECT DeviceID
  System.Window().Id,
  Min(temperature) AS MinTemp,
FROM Input TIMESTAMP BY EntryTime
GROUP BY DeviceID,
  Windows(
    Window('10 min', TumblingWindow(minute, 10)),
    Window('20 min', TumblingWindow(minute, 20)),
    Window('30 min', TumblingWindow(minute, 30)),
    Window('40 min', TumblingWindow(minute, 40)),
  )
```

The above sample aggregate query can be translated into the following execution plan, which runs the aggregate over each window separately and then takes a union of the results:

```
Source
.Multicast(s => s
.Tumbling("10 min").GroupAggregateWin(w, k, Min(e => e.temperature),(w, k, agg0) =>
{w, k, agg0.Min})
.Union(s
.Tumbling("20 min").GroupAggregateWin(w, k, Min(e => e.temperature),(w, k, agg0) =>
{w, k, agg0.Min})
.Union(s
.Tumbling("30 min").GroupAggregateWin(w, k, Min(e => e.temperature),(w, k, agg0) =>
{w, k, agg0.Min})
.Union(s
.Tumbling("40 min").GroupAggregateWin(w, k, Min(e => e.temperature),(w, k, agg0) =>
{w, k, agg0.Min})
))
```

Figure 7:
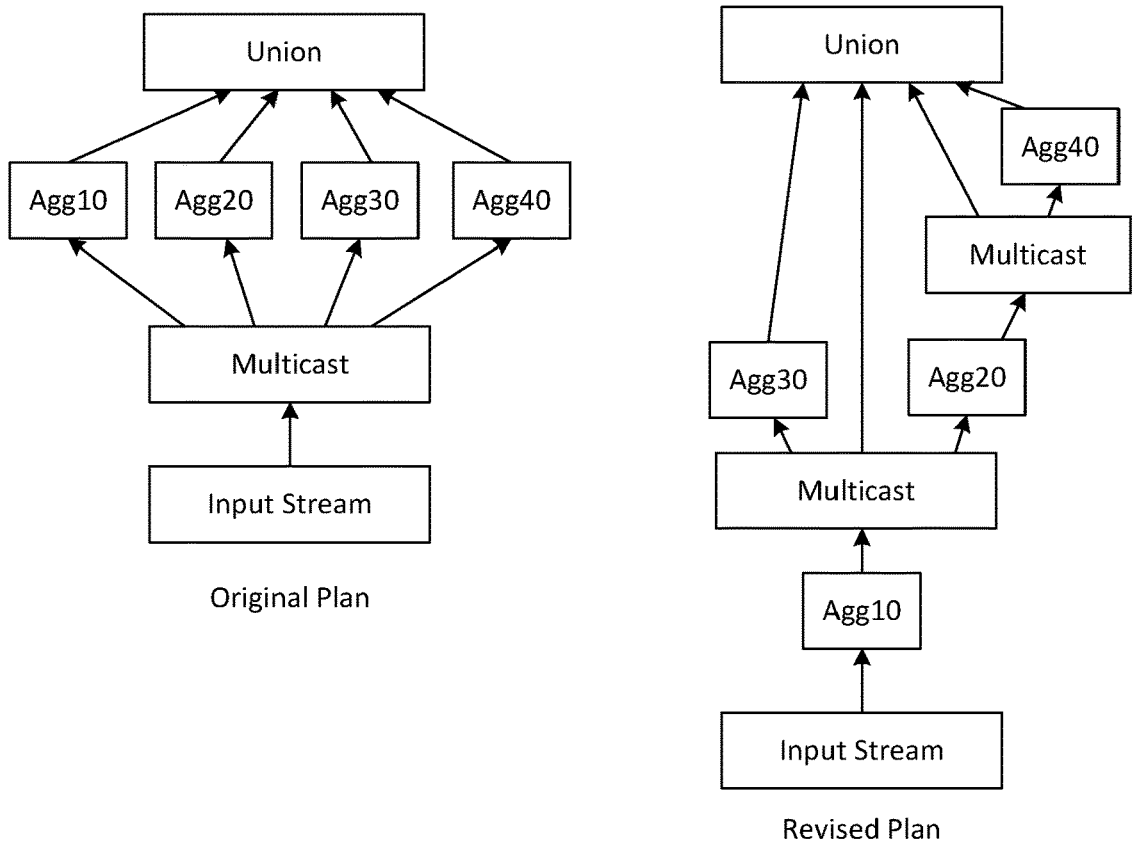
FIG. 7 illustrates an original query plan and a revised query plan in accordance with example embodiments described herein.

FIG. 7 illustrates an original query plan and a revised query plan implementing example embodiments described herein. For instance, in FIG. 7, an illustrative set of execution plans 700 by a suitable execution engine, which runs the aggregate over each window separately and then takes a union of the results. The above described plan is illustrated as the original plan shown on the left side of FIG. 7.

As shown in the above-described execution plan, the MIN function over the 20-minute tumbling window can be computed from two consecutive tuples output by the 10-minute tumbling window, instead of computing it directly from the input stream. Such overlapping relationships in the windows may be identified by stream query optimizer 108 as described herein to improve processing efficiency.

In example embodiments, cost-based optimization techniques described herein (e.g., as implemented by stream query optimizer 108) may determine the cheapest way of computing the four window aggregates in terms of an overall CPU overhead. For instance, the revised query plan shown graphically on the right side of FIG. 7 may be generated by stream query optimizer 108. Instead of computing the aggregate function over the four windows separately, the revised query plan organizes the windows into a hierarchical structure. As a result, downstream windows use sub-aggregates from their upstream windows as inputs. For instance, aggregates over the 20-minute and 30-minute windows may be computed from sub-aggregates that are outputs of the 10-minute window, and aggregates of the 40-minute window may be computed from sub-aggregates that are outputs of the 20-minute window.

Advantages over other techniques. In some implementations, benefits of the example embodiments described herein include, but are not limited to, the ability to implement optimization techniques on any suitable stream processing system (e.g., query processing system 104) at a query compilation or query plan transformation level without changing the implementation of the underlying query execution engine. Further, techniques described herein may be used with any declarative, SQL-style query language, or any other interface to stream processing systems. Such techniques may therefore be easier to implement, while also reducing computing resources utilized.

Overview. An overview is provided for the sections that follow. In Section III.B, the window coverage graph (WCG) is discussed, which is a formal model and data structure that captures the overlapping relationships between windows. In Section III.C, a cost-based optimization framework is discussed using the WCG model described herein, which may minimize the computation cost of multi-window aggregate queries, as well as related query rewritings on the optimal, minimum cost WCG. Extensions to the cost-based optimization framework are described in Section III.D by considering factor windows, which are auxiliary windows that are not present in the query but can further reduce the overall computation cost. Section III.E discusses related work. Section III.F provides proofs of certain theorems described herein. Section III.F provides concluding remarks.

B. Overlaps Between Windows

An examination of overlapping relationships between windows is provided below. Later, a window coverage graph (e.g., a window representation as described herein) is disclosed, which is a formal model and data structure that captures overlapping relationships for a given set of windows.

1. Preliminaries

As disclosed herein, a window W may be described using two parameters: r may represent the range of W that represents its duration, and s may represent the slide of W that represents the gap between its two consecutive firings.

It is assumed that s and r are integers and use the same time unit (e.g., second, minute, hour). It is also assumed $0 < s \le r$ and write $W\langle r, s\rangle$. A query processing system may refer to W as a hopping window if $s < r$, or a tumbling window if $s = r$.

A window set $\mathcal{W} = \{W_1, \ldots, W_n\}$ may represent a set of windows with no duplicates. An aggregate function $f$ defined over a window set $\mathcal{W}$ may compute a result for each $W \in \mathcal{W}$ and takes a union of the results, i.e., $f(\mathcal{W}) = \cup_{W \in \mathcal{W}} f(W)$.

Interval Representation of a Window. As an alternative to the range-slide based representation described above, a sequence of intervals to represent the lifetime of a window may also be used. It is assumed that the intervals are left-closed and right-open and define the interval representation of a window $W\langle r, s\rangle$ as $W = \{[m \cdot s, m \cdot s + r)\}$, where $m \ge 0$ is an integer. For example, the interval representation of window $W(10, 2)$ may be $\{[0,10), [2,12), [4,14), \ldots\}$.

2. Window Coverage and Partitioning

Two windows $W_1\langle r_1, s_1\rangle$ and $W_2\langle r_2, s_2\rangle$ are described to illustrate the techniques implemented by stream query optimizer 108. Using their interval representations, the windows can be represented as $W_1 = \{[m_1 \cdot s_1, m_1 \cdot s_1 + r_1)\}$ and $W_2 = \{[m_2 \cdot s_2, m_2 \cdot s_2 + r_2)\}$, where $m_1 \ge 0$ and $m_2 \ge 0$ are integers.

Definition 1 (Window Coverage). In illustrations, $W_1$ is covered by $W_2$, denoted $W_1 \le W_2$, if $r_1 > r_2$ and for any interval $I = [a, b)$ in $W_1$ there exist intervals $I_a = [a, x)$ and $I_b = [y, b)$ in $W_2$ such that $a > y$ and $x < b$. It is noted that if $W_1$ is covered by $W_2$, then these two intervals are considered unique. In some cases, a window is covered by itself.

Example 2 (Window Coverage). In an illustration, two windows are described as follows: $W_1\langle s_1 = 2, r_1 = 10\rangle$ and $W_2\langle s_2 = 2, r_2 = 8\rangle$.

Figure 8:
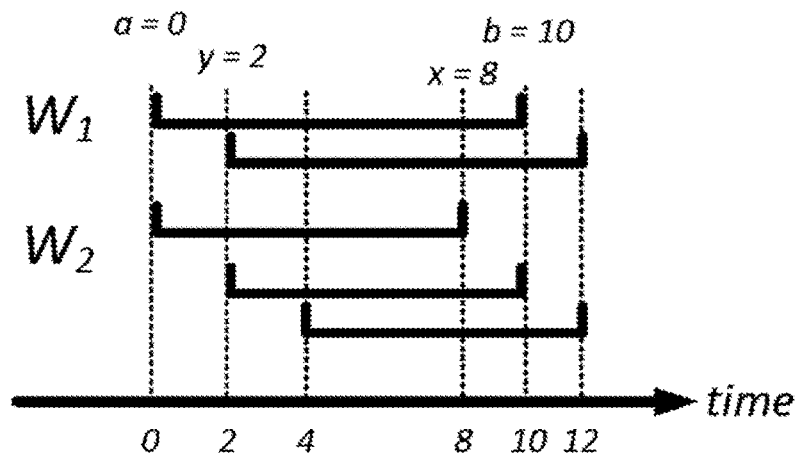
FIG. 8 illustrates an example of window coverage for an example streaming query, according to an example embodiment.

For instance, FIG. 8 illustrates an example of window coverage 800 for an example streaming query, according to an example embodiment. In FIG. 8, a plot of the first two intervals of $W_1$ ($\{[0,10), [2,12)\}$) and the first three intervals of $W_2$ ($\{[0,8), [2,10), [4,12)\}$) are illustrated. In this example, the first interval of $W_1$ is covered by the first and second intervals of $W_2$, and the second interval of $W_1$ is covered by the second and third intervals of $W_2$.

The following theorem describes certain conditions for the window coverage relationship.

Theorem 1. A theorem is described in which $W_1$ is covered by $W_2$ if and only if (1) $s_1$ is a multiple of $s_2$ and (2) $\delta_r = r_1 - r_2$ is a multiple of $s_2$.

Example 3 (Window Coverage Theorem). In another example, the windows of Example 2 is described as follows: $W_1\langle s_1 = 2, r_1 = 10\rangle$ and $W_2\langle s_2 = 2, r_2 = 8\rangle$. In this example, $s_1/s_2 = 1$, so $s_1$ is a multiple of $s_2$, and $(r_1 - r_2)/s_2 = 1$, so $r_1 - r_2$ is a multiple of $s_2$. Based on Theorem 1, $W_1$ is covered by $W_2$ in this example.

A Partial Order. The window coverage relation may describe a partial order over windows, as characterized by the following theorem:

Theorem 2. A theorem is described in which the window coverage relation is reflexive, antisymmetric, and transitive.

Interval Coverage. A situation in which $W_1 \le W_2$ is described. For any interval $I = [a, b)$ in $W_1$, $I_a = [a, x)$ and $I_b = [y, b)$ are the two intervals in $W_2$ specified by Definition 1.

Definition 2 (Covering Interval Set). The set of intervals between $I_a$ and $I_b$ in $W_2$ may be $\mathcal{J}_{a,b} = \{[u, v): a \le u \text{ and } v = b\}$. As used herein, $\mathcal{J}_{a,b}$ may represent the covering (interval) set of I.

In examples, $I_a, I_b \in \mathcal{J}_{a,b}$. The cardinality $|\mathcal{J}_{a,b}|$ may be independent of the choice of a and b. This may be represented by the covering multiplier of $W_2$ with respect to $W_1$, denoted $M(W_1, W_2)$. An analytic form for the covering multiplier is described by the following theorem:

Theorem 3. A theorem is described such that if the window $W_1\langle r_1, s_1\rangle$ is covered by the window $W_2\langle r_2, s_2\rangle$, then $M(W_1, W_2) = 1 + (r_1 - r_2)/s_2$. The following provides a description of "interval coverage" based at least on the above.

Definition 3 (Interval Coverage). A definition is described in which an interval I is covered by a set of intervals $\mathcal{J}$ if $I = \cup_{J \in \mathcal{J}} J$.

Example 4 (Interval Coverage). An interval coverage example is described. For instance, in FIG. 8, for the first interval in $W_1$ the covering set consists of the first and second intervals in $W_2$, and for the second interval in $W_1$ consists of the second and third intervals in $W_2$.

Interval/Window Partitioning. In some instances, a case of interval coverage is provided when the intervals in the covering set are disjoint.

Definition 4 (Interval Partitioning). A definition is presented such that if an interval I is covered by a set of intervals $\mathcal{J}$ such that the intervals in $\mathcal{J}$ are mutually exclusive, then I is partitioned by $\mathcal{J}$. Window partitioning may be also be described accordingly, with respect to the case of interval coverage when the intervals in the covering set are disjoint.

Definition 5 (Window Partitioning). A definition is presented such that $W_1$ is partitioned by $W_2$, if $W_1$ is covered by $W_2$ and each interval in $W_1$ is partitioned by its covering set in $W_2$.

Figure 9:
FIG. 9 illustrates a comparison of an example window partitioning with general window coverage, according to an example embodiment.
Figure 9:
Figure 9:
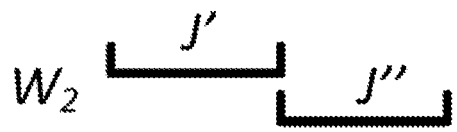
Figure 9:
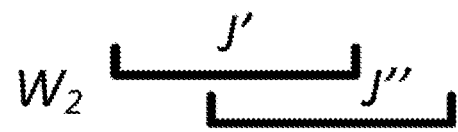

For instance, FIG. 9 illustrates a comparison 900 of an example window partitioning with general window coverage, according to an example embodiment. In FIG. 9, a difference is illustrated between window partitioning and general window coverage. As shown in FIG. 9, each interval of $W_1$ is covered by two intervals of $W_2$, i.e., $M(W_1, W_2)=2$. Conditions for window partitioning are described as follows:

Theorem 4. A theorem is described in which $W_1$ is partitioned by $W_2$ if and only if (1) $s_1$ is a multiple of $s_2$, (2) $r_1$ is a multiple of $s_2$, and (3) $r_2=s_2$ (i.e., $W_2$ is a tumbling window).

Example 5 (Window Partitioning). In Example 2 $s_1/s_2=1$ and $r_1/s_2=5$. In this example, conditions (1) and (2) in Theorem 4 is determined to hold. However, condition (3) does not hold in this example, since $r_2 \neq s_2$ (i.e., $W_2$ is not a tumbling window). As a result, $W_1$ is not partitioned by $W_2$ in this example.

3. Window Coverage Graph (WCG)

A window coverage graph may be defined as $\mathcal{G}=(\mathcal{W}, \varepsilon)$ for a given window set $\mathcal{W}$ based on the partial order introduced by the window coverage relation. For each $W_1, W_2 \in \mathcal{W}$ such that $W_1 \leq W_2$, an edge $e=(W_2, W_1)$ to the edge set $\varepsilon$. An edge may be described as a connection between windows, as described herein. The time complexity of constructing the WCG is $O(|\mathcal{W}|^2)$, and is therefore quadratic, given that checking the window coverage relationship takes constant time (Theorems 1 and 4).

C. Aggregates Over WCG

Evaluating aggregate functions over a window set that is modeled by its WCG is described as follows. A taxonomy of aggregate functions in the context of window set and WCG is provided. Next, a cost-based framework for the WCG is presented, where a reduction in the overall computation cost is also described. Further, query rewriting techniques are presented with respect to an optimal WCG.

1. Taxonomy of Aggregate Functions

In examples, f may be a given aggregate function, e.g., MIN, MAX, AVG, and so on. The function $f$ may be classified into several categories, as described below.

Distributive—f is distributive if there is some function g such that, for a table T, $f(T)=g(\{f(T_1), \ldots, f(T_n)\})$ where $\mathcal{T}=\{T_1, \ldots, T_n\}$ is a disjoint partition of T. Typical examples include MIN, MAX, COUNT, and SUM. In fact, f=g for MIN, MAX, and SUM but for COUNT g should be SUM.

Algebraic—f is algebraic if there are functions g and h such that $f(T)=h(\{g(T_1), g(T_2), \ldots, g(T_n)\})$. Typical examples are AVG and STDEV. For AVG, g records the sum and count for each subset $T_i (1 \leq i \leq n)$ and h computes the average for $T_i$ by dividing the sum by the count.

Holistic—f is holistic if there is no constant bound on the size of storage needed to describe a sub-aggregate. Typical examples include MEDIAN and RANK.

In examples, distributive or algebraic aggregate functions may be computed by aggregating sub-aggregates. It is noted that in this taxonomy, a prerequisite in some instances is provided where $\mathcal{T}=\{T_1, \ldots, T_n\}$ is a partition of T. In other words, if f is to be evaluated over a window $W_1$ by aggregating sub-aggregates that have been computed over another window $W_2$, then $W_1$ may be partitioned by $W_2$.

Theorem 5. A theorem is provided such that given that window $W_1$ is partitioned by window $W_2$, if the aggregate function $f$ is either distributive or algebraic, then f over $W_1$ can be computed by aggregating sub-aggregates over $W_2$.

If $W_1$ is only covered (but not partitioned) by $W_2$, then the type of aggregate function $f$ that can be computed using Theorem 5 is restricted, such that f remains distributive or algebraic even if the $T_i$'s in $\mathcal{T}$ exhibit an overlap. The aggregate functions MIN and MAX may retain such properties, as described as follows.

Theorem 6. A theorem is presented in which the aggregate functions MIN and MAX are distributive even if $\mathcal{T}$ is not disjoint.

2. A Cost-based Optimization Framework

Given a streaming query q that contains an aggregate function $f$ over a window set $\mathcal{W}$, a reduction in the total computation overhead of evaluating q may be desired and/or achieved by stream query optimizer 108. One approach to evaluate q is to compute f over each window of $\mathcal{W}$ one by one. However, such an approach may perform redundant computations if the windows in $\mathcal{W}$ overlap. As a result, to reduce computation, the amount of computation that is shared among overlapping windows may be leveraged. A cost-based optimization framework is presented below that leverages the overlapping relationships between windows by exploiting the window coverage relationships captured by the WCG of $\mathcal{W}$.

Cost Modeling. The following cost model may be used to capture the computation overhead in evaluating windowed aggregates.

In examples, $\mathcal{W}=\{W_1, \ldots, W_n\}$ is a window set. Given the WCG $\mathcal{G}=(\mathcal{W}, \varepsilon)$, a weight $c_i$ is assigned to each vertex (i.e., window) $W_i$ in $\mathcal{W}$ that represents its computation cost with respect to the (given) aggregate function $f$. The total computation cost is represented by the sum of these weights, i.e., $C=\Sigma_{i=1}^n c_i$. In implementations, minimization of C may be achieved based on techniques described herein.

In some example embodiments, it is assumed that the cost of computing f is proportional to the number of events (e.g., events from data generating entity 102) processed. It is assumed that a steady input event rate $\eta \geq 1$ exists. In examples, $R=\text{lcm}(r_1, \ldots, r_n)$ is the least common multiple of the ranges of the windows $W_1\langle r_1, s_1 \rangle, \ldots, W_n\langle r_n, s_n \rangle$ in $\mathcal{W}$. For each window $W_i$, the cost $c_i$ of computing f over $W_i$ for events in a period of length R may depend on at least two quantities. A recurrence count $n_i$ may represent a number of intervals (i.e., instances) of $W_i$ occurring during the period of R, and an instance cost $\mu_i$ may represent a cost of evaluating each instance of $W_i$. In examples, $c_i=n_i \cdot \mu_i$. An analysis of the two quantities is provided below.

Recurrence count. For each window $W_i$, $m_i=R/r_i$ may represent its multiplicity. The recurrence count $n_i$ of $W_i$ may be written as $$n_i = 1 + (m_i - 1)\frac{r_i}{s_i}.$$

Figure 10:
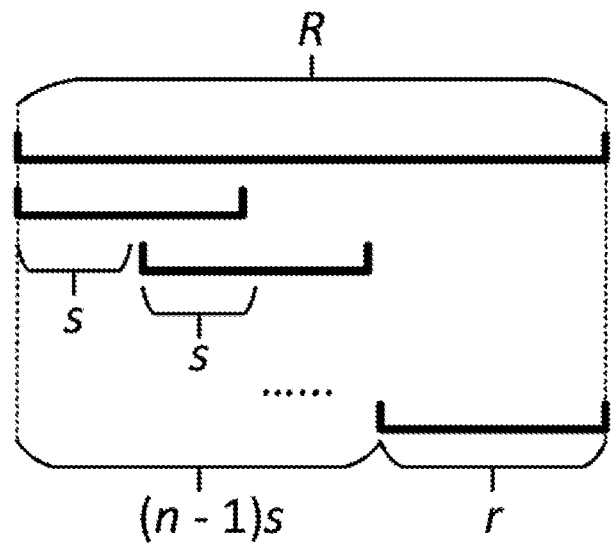
FIG. 10 illustrates a recurrence count of an example streaming query, according to an example embodiment.

For instance, FIG. 10 illustrates a recurrence count 1000 of an example streaming query, according to an example embodiment. In FIG. 10, it is illustrated how the above formula is obtained for $n_i$. For instance, $R=(n_i-1)\cdot s_i+r_i$, which yields $$n_i = 1 + \frac{R-r_i}{s_i} = 1 + \left(\frac{R}{r_i}-1\right)\frac{r_i}{s_i} = 1 + (m_i-1)\frac{r_i}{s_i}.$$

If $W_i$ is a tumbling window, then $n_i=m_i$. It is assumed in some instances that $r_i$ is a multiple of $s_i$ so that $n_i$ is an integer.

Instance cost. In an absence of computation sharing, the instance cost of $W_i$ is $\mu_i=\eta \cdot r_i$. Sharing computation using techniques described herein, however enables reducing the computation cost. For instance, where windows $W_1\langle r_1, s_1\rangle$ and $W_2\langle r_2, s_2\rangle$ are considered, the following observation can be described:

Observation 1. In an observation, if $W_1$ is covered by one or more $W_2$'s, then the instance cost of $W_1$ can be reduced to $$\mu_1 = \min_{W_2 s.t.\ W_1 \leq W_2}\{n_1 \cdot M(W_1, W_2)\}.$$

Cost Minimization. An illustrative algorithm ("Algorithm 1") is shown below that describes a procedure for finding a minimum overall cost based on the WCG, cost model, and Observation 1:

---
Algorithm 1: Determine minimum cost WCG.
---

Input: $\mathcal{W} = \{W_i\}_{i=1}^n$, a window set; $f$, an aggregate function.
Output: $\mathcal{G}_{min}$, the minimum cost WCG w.r.t. $\mathcal{W}$ and $f$.
1 Construct the WCG $\mathcal{G} = (\mathcal{W}, \varepsilon)$ with respect to "covered by" or "partitioned by" as determined by $f$;
2 foreach $W_i \in \mathcal{W}$ do
3    Initialize its cost $c_i \leftarrow n_i \cdot (\eta \cdot r_i)$;
4 foreach $W' \in \mathcal{W}$ such that $(W', W_i) \in \varepsilon$ do
5    Revise cost $c_i \leftarrow \min\{c_i, n_i \cdot M(W_i, W'_i)\}$;
6 foreach $W_i \in \mathcal{W}$ do
7    Remove all incoming edges that do not correspond to (the final value of) $c_i$;
8 return the result graph $\mathcal{G}_{min}$;

---

In examples, Algorithm 1 may be implemented by window representation generator 302, as described herein. As shown above, Algorithm 1 constructs a WCG $\mathcal{G}$ with respect to the given window set $\mathcal{W}$ and aggregate function $f$ (line 1). It is noted that it may be determined, based on f, whether to use "covered by" or "partitioned by" when constructing the WCG. In implementations, "covered by" semantics represents when f is MIN or MAX, and "partitioned by" represents when f is COUNT, SUM, and AVG, which are part of the SQL standard. It is noted and understood that other aggregate functions may also be included in these lists. The windows are then processed one by one (lines 2 to 5).

For each window $W_i$, at line 3, the cost is initialized with $c_i=n_i\cdot(\eta\cdot r_i)$. Where $W_i$ is a tumbling window, the initial cost is $c_i=m_i\cdot(\eta\cdot r_i)=\eta\cdot R$. Iterations are then performed over incoming edges (W', $W_i$), revising the cost $c_i$ with respect to Observation 1 (lines 4 to 5). Finally, edges are removed that do not correspond to the one that led to the minimum cost (lines 6 to 7). The result is graph $\mathcal{G}_{min}$, called the minimum cost WCG, or min-cost WCG, which captures minimum cost information. The WCG is then input to the query rewriting algorithm described herein (e.g., implemented by query rewriter 310).

Example 6. An example is described in which the sample query described above with respect to Example 1 contains four tumbling windows: $W_1\langle 10,10\rangle$, $W_2\langle 20,20\rangle$, $W_3\langle 30,30\rangle$, and $W_4\langle 40,40\rangle$. It is noted that the particular aggregate function $f$ need not be utilized in these examples, since "covered by" and "partitioned by" semantics coincide when each window in a window set are tumbling windows.

In an illustrative example, it is assumed that an incoming event ingestion rate $\eta=1$ exists, and the total cost of computing the four windows is $C=4\eta R=4R=480$, where $R=\text{lcm}\{10,20,30,40\}=120$.

Figure 11:
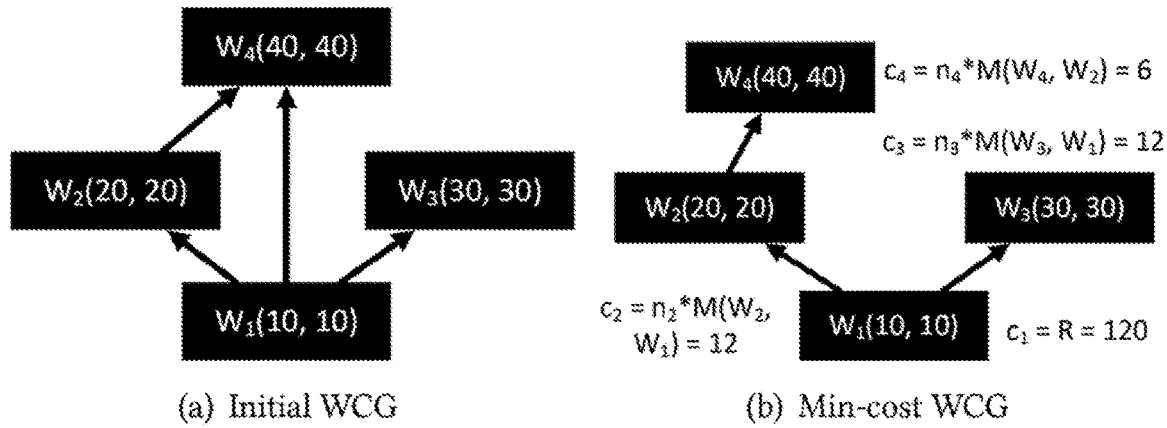
FIG. 11 illustrates example window coverage graphs, according to an example embodiment.

For instance, FIG. 11 illustrates example window coverage graphs 1100, according to an example embodiment. In FIG. 11 the initial WCG (as illustrated as FIG. 11(a)) and the final min-cost WCG (as illustrated as FIG. 11(b)) is shown, by running Algorithm 1, when exploiting the overlaps between the windows. It is described below how Algorithm 1 generates the min-cost WCG. For instance, for the four tumbling windows:

$n_1=m_1=R/r_1=120/10=12$, $n_2=m_2=R/r_2=120/20=6$, $n_3=m_3=R/r_3=120/30=4$, and $n_4=m_4=R/r_4=120/40=3$.

Following the window coverage relationship captured by the initial WCG, the corresponding covering multipliers for the edges can be computed as follows:

$M(W_2,W_1)=1+(r_2-r_1)/s_1=1+(20-10)/10=2$, $M(W_3,W_1)=1+(r_3-r_1)/s_1=1+(30-10)/10=3$, $M(W_4,W_1)=1+(r_4-r_1)/s_1=1+(40-10)/10=4$, and $M(W_4,W_2)=1+(r_4-r_2)/s_2=1+(40-20)/20=2$.

As a result, Algorithm 1 identifies $W_2$ as a (unique) upstream window for $W_4$, and identify $W_1$ as a (unique) upstream window for $W_2$ and $W_3$ in the final min-cost WCG. The total cost is therefore reduced to the following, which represents a 62.5% reduction from the initial cost $C=480$:

$$C' = c'_1 + c'_2 + c'_3 + c'_4$$
$$= R + n_2 \cdot M(W_2, W_1) + n_3 \cdot M(W_3, W_1) + n_4 \cdot M(W_4, W_2)$$
$$= 120 + 6 \cdot 2 + 4 \cdot 3 + 3 \cdot 2 = 150$$

3. Query Rewriting

To leverage the benefits of shared window computation, the original query plan may be rewritten with respect to the min-cost WCG $\mathcal{G}_{min}$ based on the following.

Theorem 7. A theorem is described in which the min-cost WCG $G_{min}$ is a forest, i.e., a collection of trees. A proof is provided in which each window in $G_{min}$ has at most one incoming edge (due to lines 6 to 7 in Algorithm 1).

FIG. 7 shows how the query execution plan is revised in Example 1. FIG. 7(a) presents the original plan and the revised plan based on the min-cost WCG. The translated expression (e.g., revised query) can be as follows:

---

Source
.Tumbling("10 min").GroupAggregateWin(w, k, Min(e => e.temperature),(w, k, agg0)=>{w, k, agg0.Min}) .Multicast(s=>s
  .Union(s
    .Tumbling("20 min").GroupAggregateWin(w, k, Min(e => e.sagg0),(w, k, agg0)=>{w, k, agg0.Min})
    .Multicast(s=>s
      .Union(s
        Tumbling("40 min").GroupAggregateWin(w, k, Min(e => e.sagg1), (w, k, agg0)=>{w, k, agg0.Min}))))
  .Union(s
    .Tumbling("30 min").GroupAggregateWin(w,k,Min(e => e.sagg0),(w, k, agg0)=> {w, k, agg0.Min}).

---

In examples, given $\mathcal{G}_{min}$ that captures an optimized window coverage relationship, the query rewriting algorithm is described as follows. For instance, an original query plan may be represented as: Input Stream→MultiCast→ $\mathcal{W} = \{W_1, \ldots, W_n\}$→Union. In this example, $\mathcal{W}$ is replaced by the min-cost WCG $\mathcal{G}_{min}$: Input Stream→MultiCast→$\mathcal{G}_{min}$→Union.

The following steps may then be performed. For each window w (in $\mathcal{G}_{min}$) without an incoming edge, a link is created from MultiCast to w. The MultiCast operator is removed if there is only one such w. For each (intermediate) window v with outgoing edges, a MultiCast operator $M_v$ is inserted. A link is created from v to $M_v$ and a link is created from $M_v$ to Union. For each (v, u) of v's outgoing edges, a link is created from $M_v$ to u. For each window w without outgoing edges, a link is created from w to Union. Thus, in this illustrative technique, a query rewriting algorithm may be implemented.

D. Factor Windows

In some further implementations, auxiliary windows are added that are not in the original window set (e.g., as provided in the original query), but may nevertheless contribute to a reduction in an overall computation cost. Such auxiliary windows are also referred to as "factor" windows.

Definition 6. In examples, a definition is described such that given a window set $\mathcal{W}$, a window W is called a factor window with respect to $\mathcal{W}$ if $W \notin \mathcal{W}$ and there exists some window $W' \in \mathcal{W}$ such that $W' \leq W$. It is noted that in some implementations, the results of factor windows is not exposed to users (e.g., users of query generating entity 112), as the factor windows are not part of the original query.

Example 7. In an illustrative example, Example 1 is modified by removing the tumbling window $W_1(10,10)$. The resulting query Q contains three tumbling windows $W_2(20, 20)$, $W_3(30,30)$, and $W_4(40,40)$. The cost of directly computing them is C=3R=360 (i.e., without considering overlapping windows) as here R=lcm{20,30,40}=120 remains the same.

Figure 12:
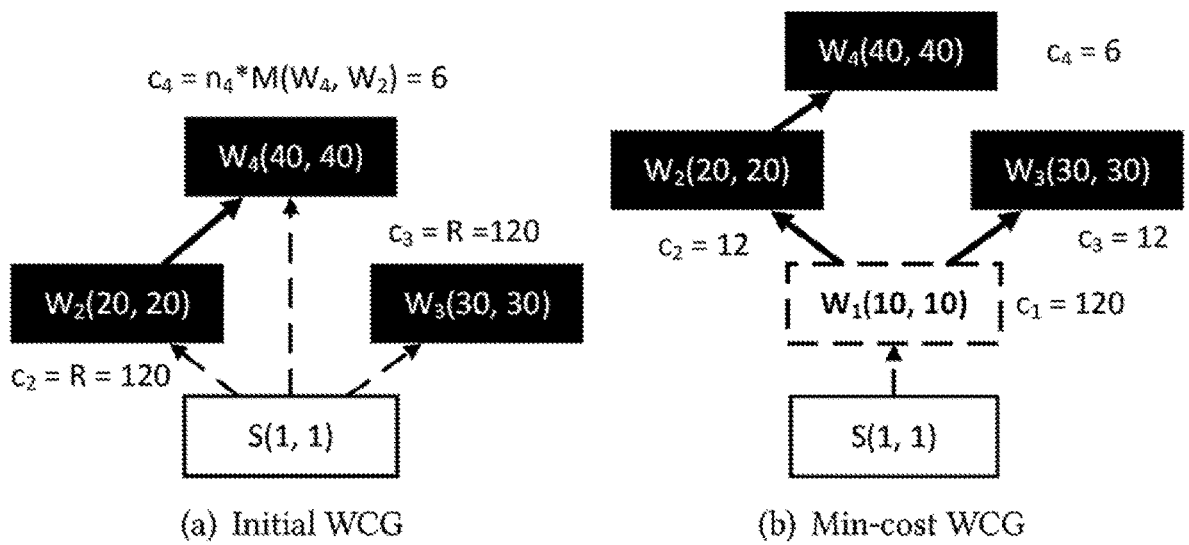
FIG. 12 illustrates example costs for window coverage graphs, according to an example embodiments.

FIG. 12 illustrates example costs 1200 for window coverage graphs, according to an example embodiment. If Algorithm 1 is applied over Q, the min-cost WCG presented in FIG. 12(a) is generated. In this situation, the overall cost may be represented as follows, which represents a reduction of 31.7% from the baseline cost of C=360:

$$C' = c'_2 + c'_3 + c'_4$$
$$= R + R + n_4 \cdot M(W_4, W_2)$$
$$= 120 + 120 + 3 \cdot 2 = 246$$

The illustrative algorithm ("Algorithm 2") shown below may be implemented to find a minimum cost WCG when factor windows are utilized, as described herein:

---

Algorithm 2: Determine minimum cost WCG when factor windows are utilized.

Input: $\mathcal{W} = \{W_i\}_{i=1}^n$, a window set; $f$, an aggregate function.

Output: $\mathcal{G}_{min}$, the minimum cost WCG w.r.t. $\mathcal{W}$ and $f$, where factor windows are utilized.
  1 Main:
  2 Construct the WCG $\mathcal{G} = (\mathcal{W}, \varepsilon)$ w.r.t. "covered by" or "partitioned by" as determined by $f$;
  3 foreach $W \in \mathcal{W}$ do

| Algorithm 2: Determine minimum cost WCG when factor windows are utilized. |
|---|
| 4    $W_f \leftarrow$ FindBestFactorWindow(W, W's downstream windows $\{W_1, \ldots, W_K\}$); |
| 5      Expand $\mathcal{G}$ by adding $W_f$ and the corresponding edges (as in FIG. 14); |
| 6    $\mathcal{G}_{min} \leftarrow$ Run lines 2-7 of Algorithm 1 over the expanded $\mathcal{G}$; |
| 7    return the result graph $\mathcal{G}_{min}$; |
| 8 |
| 9    FindBestFactorWindow(W, W's downstream windows $\{W_1, \ldots, W_K\}$): |
| 10    Construct the set $\mathcal{W}_f$ of candidate factor windows with respect to FIG. 14; |
| 11    Remove candidates from $\mathcal{W}_f$ that are not beneficial, using Equation 3; |
| 12    return the best $\mathcal{W}_f$ w.r.t. the maximum estimated cost reduction by Equation 2; |

In examples, Algorithm 2 may be implemented by window representation generator 302, as described herein. If factor windows are utilized and Algorithm 2 is applied over Q, the min-cost WCG in FIG. 12(b) is generated. As shown in FIG. 12(b), window $W_1\langle 10,10\rangle$ is "added back" as a factor window, which participates in evaluating Q (but may not expose its result to users as this was not part of the original query). As in Example 6(a), the overall cost may be C″=150, which is 58.3% less than the baseline cost C=360 and 39% less than the cost C′=246 without utilization of factor windows.

1. Impact of Factor Window

Augmented WCG. For the WCG $\mathcal{G} = (\mathcal{W}, \varepsilon)$ induced by the given window set $\mathcal{W}$ and aggregate function $f$, a virtual tumbling window $S\langle r=1, s=1\rangle$ is added into $\mathcal{W}$, and an edge (S, W) is added into E for each $W \in \mathcal{W}$ that has no incoming edges (i.e., W is not covered by any other window). However, if such an S already exists in $\mathcal{W}$, another edge is not added. S may represent a window consisting of atomic intervals that emit an aggregate for each time unit, and therefore S may cover all windows in W. The computation cost of S can be represented as $\eta \cdot R$, as it is not covered by other windows. This augmented graph may comprise a directed acyclic graph (DAG) with a single "root" S. In certain implementations described below, therefore, the WCG may refer to an augmented version. It is noted that such an augmented WCG may utilize the same "covered by" or "partitioned by" semantics determined by the aggregate function $f$, when adding factor windows.

Figure 13:
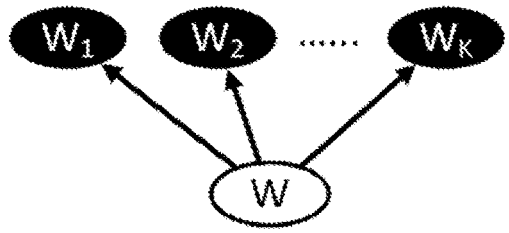
FIG. 13 illustrates basic patterns in a window coverage graph, according to an example embodiment.
Figure 13:
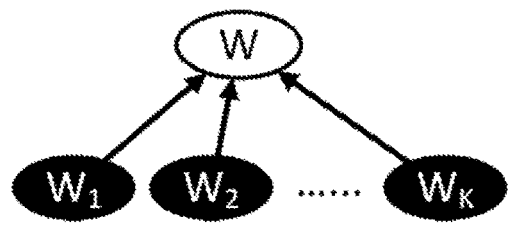

Two Basic Patterns. FIG. 13 illustrates basic patterns 1300 in a window coverage graph, according to an example embodiment. For instance, FIG. 13 illustrates two basic patterns in (the augmented) WCG, for an arbitrary window $W \in \mathcal{W}$. Implementations described below relate to the pattern shown in FIG. 13(a), as W can affect the costs of downstream windows. Accordingly, in some implementations, windows in a WCG without outgoing edges are not considered.

Figure 14:
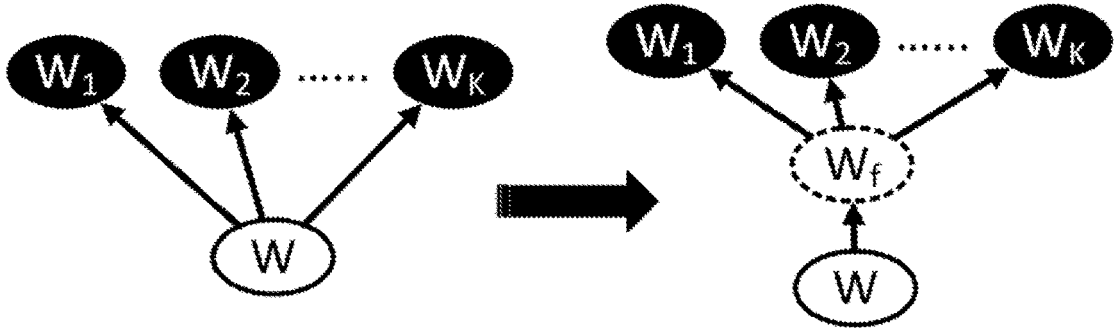
FIG. 14 illustrates an impact of a factor window in a sample plan, according to an example embodiment.

Analysis of Impact. FIG. 14 illustrates an impact of a factor window in a sample plan 1400, according to an example embodiment. As shown in FIG. 14, $W_f$ is a factor window inserted "between" W and its downstream windows $W_1, \ldots, W_n$. This can be performed for all "intermediate" vertices, i.e., windows with both incoming and outgoing edges, in (the augmented) WCG, due at least in part to the added virtual "root" S. Accordingly, it is observed that $W_f \leq W$, as well as $W_j \leq W_f$ for $1 \leq j \leq K$. The overall computation costs is compared with and without inserting $W_f$. The cost with the factor window $W_f$ can be represented as: $c = \sum_{j=1}^{K} \text{cost}(W_j) + \text{cost}(W_f) + \text{cost}(W)$.

On the other hand, the cost without $W_f$ can be represented as: $c' = \sum_{j=1}^{K} \text{cost}'(W_j) + \text{cost}(W)$. Since $\text{cost}(W_j) = n_j \cdot M(W_j, W_f)$, $\text{cost}(W_f) = n_f M(W_f, W)$, and $\text{cost}'(W_j) = n_j \cdot M(W_j, W)$, it then follows that $c - c' = \sum_{j=1}^{K} n_j (M(W_j, W_f) - M(W_j, W)) + n_f M(W_f, W)$. By Theorem 3, $M(W_j, W_f) = 1 + (r_j - r_f)/s_f$, $M(W_j, W) = 1 + (r_j - r_W)/s_W$, and $M(W_f, W) = 1 + (r_f - r_W)/s_W$. Substituting into the above equation, the following is observed:

$$c - c' = \sum_{j=1}^{K} n_j \left( \frac{r_j - r_f}{s_f} - \frac{r_j - r_W}{s_W} \right) + n_f \left( 1 + \frac{r_f - r_W}{s_W} \right).$$

The following quantities are described to simplify the notation: $\rho_j = r_j/r_f$, $k_j = r_j/s_j$, $1 \leq j \leq K$, $k_f = r_f/s_f$, and $k_W = r_W/s_W$.

With this simplified notation, the following are observed:

$$c - c' = n_f \left( \sum_{j=1}^{K} \frac{n_j}{n_f} \left( \frac{r_j}{s_f} - k_f - \frac{r_j}{s_W} + k_W \right) + \left( 1 + \frac{r_f}{s_W} - k_W \right) \right).$$

Inserting $W_f$ improves if $c \leq c'$, i.e., $$\sum_{j=1}^{K} \frac{n_j}{n_f} \left( \frac{r_j}{s_f} - k_f - \frac{r_j}{s_W} + k_W \right) + \left( 1 + \frac{r_f}{s_W} - k_W \right) \leq 0.$$

2. Candidate Generation and Selection

Equation 3 may be used to determine whether a factor window is beneficial. In implementations, each candidate factor window that is potentially beneficial may be identified, from which an optimal one may be selected. The candidate generation and selection process is described below. In examples, the candidate generation phase may comprise two steps:

Generation of eligible slides: Where $s_d = \gcd\{s_1, \ldots, s_K\}$, the set of candidates $s_f$ is $\mathcal{S}_f = \{s_f: s_d \bmod s_f = 0 \text{ and } s_f \bmod s_W = 0\}$.

Generation of eligible ranges: Where $r_{min} = \min\{r_1, \ldots, r_K\}$, for each $s_f \in \mathcal{S}_f$, the set of candidates $r_f$ is $\mathcal{R}_f = \{r_f: r_f \bmod s_f = 0 \text{ and } r_f \leq r_{min}\}$.

For each eligible pair $(s_f, r_f)$, a candidate factor window $W_f \langle r_f, s_f \rangle$ is constructed, and it is the window coverage constraints in FIG. 14 are checked, i.e., $W_f \leq W$ and $W_k \leq W_f$ for $1 \leq k \leq K$. Where $W_f$ is beneficial (by Equation 3), it is included in the candidate factor windows $\mathcal{W}_f$.

Candidate Selection. Many candidate factor windows in $\mathcal{W}_f$ may be beneficial (i.e., Equation 3 holds). In example embodiments, the candidate factor window that leads to a minimum overall cost is added. To select it from the candidates, the estimated cost reduction by Equation 2 is compared and the candidate factor window that leads to a maximum cost reduction is selected.

3. Summary

As described above, Algorithm 2 represents a revised version of Algorithm 1 that returns a min-cost WCG when factor windows are utilized. Algorithm 2 first extends the original WCG by adding the best factor windows found for existing windows (lines 3 to 5), using techniques in Sections III.D.1 and III.D.2 (in lines 9 to 12). It then invokes techniques provided in Algorithm 1 on the extended WCG (rather than the original one) to identify a new min-cost WCG that contains factor windows (line 6).

In some situations, Algorithm 2 may still provide certain benefits, but may not be as optimal as Algorithm 1. However, in observations, Algorithm 2 often outperforms Algorithm 1, returning a WCG with orders-of-magnitude lower cost. Nevertheless, it is contemplated that in some implementations, both Algorithm 1 and Algorithm 2 may be utilized to generate a minimum-cost WCG, and the lower cost one of the two is utilized to process a query.

3. The Case of "Partitioned By"

The procedure referred to as FindBestFactorWindow in Algorithm 2 is improved in some situations if the window coverage relationships are reduced to "partitioned by" semantics, which may work for certain additional or other types of aggregate functions. In some situations, the candidate factor windows is restricted to tumbling windows (by Theorem 4).

The illustrative algorithm ("Algorithm 3") shown below may be implemented to determine whether a factor window would be beneficial under "partitioned by" semantics.

---

Algorithm 3: Determine whether a factor window would be beneficial under "partitioned by" semantics.

---

Input: A factor window $W_f$ and a target window W with its downstream windows $W_1, \ldots, W_K$.
Output: Return true if adding $W_f$ improves the overall cost, false otherwise.

1  if K ≥ 2 then
2     return true;
3  // K = 1 hereafter.
4  if $k_1$ = 1 then
5     return false;
6  else
7     // $k_1$ > 1 hereafter.
8     if $k_1$ ≥ 3 and $m_1$ ≥ 3 then
9        return true;
10    else 11    Compute $\dfrac{r_f}{r_W}$ and $\dfrac{\lambda}{\lambda - 1} = 1 + \dfrac{m_1}{(m_1 - 1)(k_1 - 1)}$;

12    return true if $\dfrac{r_f}{r_W} \geq \dfrac{\lambda}{\lambda - 1}$, false otherwise.

---

Revisit of Impact of Factor Windows. As described above, it can be determined whether a factor window is beneficial under "partitioned by" semantics. Algorithm 3 summarizes the procedure that may be used to determine whether a factor window $W_f$ is beneficial in the case of "partitioned by." Here, the quantity λ is defined as $$\lambda = \Sigma_{j=1}^K \frac{n_j}{m_j}.$$

In examples, Algorithm 3 may be implemented by window representation generator 302, as described herein. The procedure in Algorithm 3 is described below.

Case 1. In a first illustration, if $W_f$ only has one downstream window $W_1$ that is tumbling (i.e., the case when K=1 and $k_1$=1), then a factor window does not reduce the overall cost because each sub-aggregate from W is used to compute $W_f$ itself. Without $W_f$, the same sub-aggregates can be used to compute $W_1$ directly.

Case 2. In a second illustration, if $W_f$ has two or more downstream windows (i.e., when K 2), then an improvement to an overall cost is achieved, since now at least one downstream window benefits from reading sub-aggregates from $W_f$ (rather than from W). Additional explanation is provided in certain other situations (e.g., as shown in FIG. 14) when K=2 and all windows are tumbling. Equation 2 can be simplified by noticing $k_j=k_W=1$, $r_j=s_j$, and $r_W=s_W$, since both $W_f$ and W are tumbling windows:

$$c - c' = \Sigma_{j=1}^2 n_j \cdot \left( \frac{r_j}{r_f} - \frac{r_j}{r_W} \right) + n_f \cdot \frac{r_f}{r_W}.$$

Moreover, since all windows are tumbling, $n_j=m_j=R/r_j$ for j ∈ {1,2}, and $n_f=m_f=R/r_f$. As a result, $$c - c' = R \cdot \left( \frac{2}{r_f} - \frac{1}{r_W} \right) \leq 0, \text{ since } r_f \geq 2r_W$$

in accordance with Theorem 4. The case when $W_f$ has one unique downstream window $W_1$ that is not tumbling (i.e., when K=1 and $k_1$>1) can be analyzed in a similar way, as sub-aggregates from $W_f$ can reduce cost for intervals in $W_1$ that overlap.

Theorem 8. A theorem is described in which Algorithm 3 correctly determines whether $W_f$ would help when both $W_f$ and W are tumbling windows.

As described earlier, techniques are provided in which candidate generation and selection are performed under "partitioned by" semantics. These techniques are further described as follows.

Candidate Generation. By restricting to tumbling windows under "partitioned by" semantics, the search space for potential candidates may be reduced. By Theorem 4, the range $r_f$ of a factor window $W_f$ is a common factor of the ranges $r_1, \ldots, r_K$ of all downstream windows $W_1, \ldots, W_K$ for a given target window W (e.g., as shown in FIG. 14). Moreover, $r_f$ is be a multiple of the range $r_W$ of the target window W. As a result, candidates can be enumerated by starting from a greatest common divisor r of $r_1, \ldots, r_K$ and all factors $r_f$ of r that are also multiples of $r_W$ can be identified.

Figure 15:
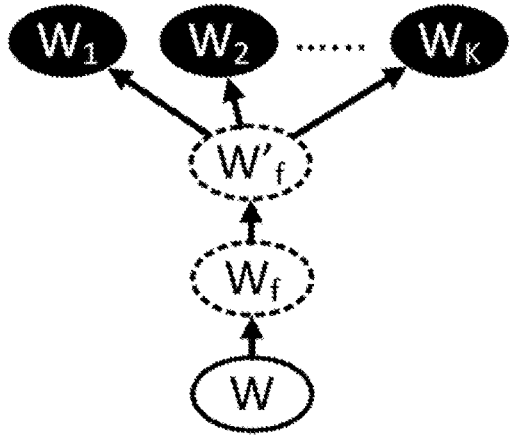
FIG. 15 illustrates dependent and independent factor windows in a sample plan, according to an example embodiment.
Figure 15:
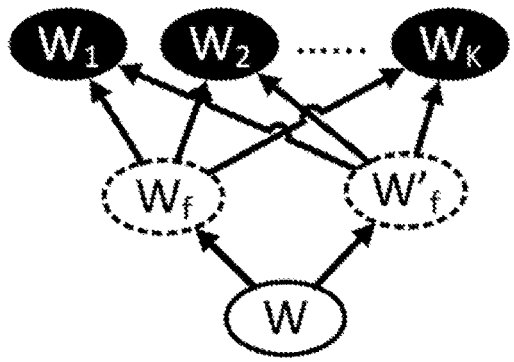

Candidate Selection. To find an appropriate factor window, the benefits of two candidates $W_f$ and $W'_f$ are compared. For instance, FIG. 15 illustrates dependent and independent factor windows in a sample plan 1500, according to an example embodiment. There are two cases as shown in FIG. 15: $W_f$ and $W'_f$ are dependent, meaning either $W_f \leq W'_f$ or $W'_f \leq W_f$, as shown in FIG. 15(a), and $W_f$ and $W'_f$ are independent, as shown in FIG. 15(b). Each is described in greater detail below.

Dependent Candidates. $W_f$ and $W'_f$ may be two eligible factor windows such that $W'_f \leq W_f$. Then $W_f$ can be omitted in some implementations as adding it may not reduce the overall cost. This can be understood by running Algorithm 3 against $W_f$, by viewing $W'_f$ as $W_f$'s only (tumbling) downstream window. Algorithm 3 would return false as this is the case when K=1 and $k_1$=1 (line 5).

Independent Candidates. For the independent case, the costs are compared in further detail. Specifically, the costs may be represented as follows:

$$c_f = \sum_{j=1}^{K} \text{cost}(W_j) + \text{cost}(W_f) + \text{cost}(W)$$
$$= \sum_{j=1}^{K} n_j \cdot M(W_j, W_f) + n_f \cdot M(W_f, W) + \text{cost}(W), \text{ and}$$

$$c'_f = \sum_{j=1}^{K} \text{cost}(W_j) + \text{cost}(W'_f) + \text{cost}(W)$$
$$= \sum_{j=1}^{K} n_j \cdot M(W_j, W'_f) + n'_f \cdot M(W'_f, W) + \text{cost}(W).$$

Theorem 9. A theorem is described in which $W_f$ and $W'_f$ are two eligible factor windows that are independent under "partitioned by" semantics. Then $$c_f \leq c'_f \text{ if } \frac{r_f}{r'_f} \geq \frac{\lambda - \frac{r_f}{r_W}}{\lambda - \frac{r'_f}{r_W}}.$$

In this illustration, $\lambda$ is defined as above in Equation 4.

Since $\lambda$ is a constant that does not depend on $W_f$ or $W'_f$, Equation 5 represents a comparison of costs as an evaluation of three quantities:

$$\frac{r_f}{r'_f}, \frac{r_f}{r_W}, \text{ and } \frac{r'_f}{r_W}.$$

Algorithm 4 presents the details of picking the best factor window for a target window W and its downstream windows $W_1, \ldots, W_K$, under "partitioned by" semantics. An example implementation of such an algorithm is as follows:

that are dominated by others (lines 11 to 13). Finally, it identifies the best $W_f$ from the remaining candidates, with respect to Theorem 9.

Example 8. Continuing with Example 7, in another illustrative example, Algorithm 4 generates three candidate factor windows W(10,10), W(5,5), and W(2,2), since each of them are beneficial according to Algorithm 3 (K=2 indeed). However, since both W(5,5) and W(2,2) cover W(10,10), these two candidates are removed and W(10,10) is the remaining, best candidate for this particular non-limiting example. To confirm this selection, the benefits can be compared for the three candidates. For instance, it can be computed that (1) W(2,2) leads to the same cost 240 when considering the pattern in FIG. 14 including $W_2$ and $W_3$; (2) W(5,5) leads to the cost 168, a reduction of 30%; and (3) W(10,10) leads to the cost 150, a reduction of 37.5%.

E. Additional Advantages

The following section describes work related to techniques disclosed herein.

Techniques described herein relate to, among other things, optimization techniques dedicated to window aggregates. Unlike other techniques, internal overlapping relationships between correlated windows are identified and exploited, which are ignored in other systems. Further, utilizing such overlapping can provide additional advantages when factor windows are enabled.

Further, moving to a declarative interface may enable compile-time query optimization. The optimization techniques described herein can be implemented in either imperative or declarative systems, or any other suitable system. Techniques are demonstrated herein for an SQL query compiler (Section III.C.3), although implementations are not so limited and can be applied in streaming systems that support other declarative query languages.

F. Proofs

The following section describes proofs for theorems disclosed herein. It is noted that this section is not intended to

---

Algorithm 4: Pick an appropriate factor window under "portioned by" semantics

Input: A target window W with its downstream windows $W_1, \ldots, W_K$.
Output: Return an appropriate factor window $W_f$ that led to the minimum overall cost.
1  Find the greatest common divisor (GCD) of the ranges of the downstream windows
d = gcd({$r_1, \ldots, r_K$});
2  if d = $r_w$ then
3      return W
4  Find all factors $\mathcal{F}$ of d that are multiples of $r_W$;
5  $\mathcal{W}_f \leftarrow \emptyset$
6  foreach $r_f \in \mathcal{F}$ do
7      Construct a tumbling window $W_f$ with range $r_f$;
8      Run Algorithm 3 for $W_f$, W, and $W_1, \ldots, W_K$;
9      if Algorithm 3 return true then
10         $\mathcal{W}_f \Longleftarrow \mathcal{W}_f \cup \{W_f\}$;
11 foreach $W_f \in \mathcal{W}_f$ do
12    if there exists $W'_f$ s.t. $W'_f \leq W_f$ then
13       $\mathcal{W}_f \Longleftarrow \mathcal{W}_f - \{W_f\}$;
14 return the best $W_f \in \mathcal{W}_f$ by Theorem 9;

---

In examples, Algorithm 4 may be implemented by window representation generator 302, as described herein. As shown above, Algorithm 4 begins by enumerating all candidates for $W_f$ based on the constraint that $r_f$ is a common factor of $\{r_1, \ldots, r_K\}$ and a multiple of $r_W$ (lines 1 to 4). It returns W if no candidate can be found (line 3). It then filters out candidates of $W_f$ that are not beneficial, using Algorithm 3 (lines 5 to 10). It then further prunes dependent candidates limit techniques disclosed herein, but is merely provided for additional explanation with respect to each of the theorems disclosed above.

Proof of Theorem 1: An arbitrary interval I=[a, b)∈ $W_1$ is considered. By the interval representation of $W_1$, a=$m_1 \cdot s_1$ and b=$m_1 \cdot s_1 + r_1$ for some integer m≥0.

With respect to the "if" portion, since $s_1$ is a multiple of $s_2$, $s_1 = k \cdot s_2$ for some integer k≥1. As a result, $m_1 \cdot s_1 = m_1 \cdot k \cdot s_2 = (m_1 \cdot k) \cdot s_2$.

Similarly, since $\delta_4 = r_1 - r_2$ is a multiple of $s_2$, $r_1 - r_2 = k' \cdot s_2$ for some integer $k' \geq 1$. As a result, the following relationships can be observed: $m_1 \cdot s_1 + r_1 = (m_1 \cdot k) \cdot s_2 + k' \cdot s_2 + r_2$ and $= (m_1 \cdot k + k') \cdot s_2 + r_2$.

The relationships $m_2 = m_1 \cdot k$ and $m'_2 = m_1 \cdot k + k'$ also hold. Two intervals $I_a = [a, x) = [m_2 \cdot s_2, m_2 \cdot s_2 + r_2)$ and $I_b = [y, b) = [m'_2 \cdot s_2, m'_2 \cdot s_2 + r_2)$ that belong to $W_2$ are considered. As a result, the following relationships are observed: $m_2 \cdot s_2 = m_1 \cdot s_1 = a$, and $m'_2 \cdot s_2 + r_2 = m_1 \cdot s_1 + r_1 = b$. Moreover, since $m'_2 > m_2$, $x = m_2 \cdot s_2 + r_2 < b$ and $y = m'_2 \cdot s_2 > a$. Therefore, $W_1$ is covered by $W_2$, by Definition 1.

With respect to the "only if" portion, since $W_1$ is covered by $W_2$, by Definition 1 there exists two intervals $I_a = [a, x)$ and $I_b = [y, b)$ in $W_2$ such that $x < b$ and $y > a$. As a result, there is some $m_2 \geq 0$ such that $m_2 \cdot s_2 = a = m_1 \cdot s_1$. That is, $m_2 = m_1$.

$$\left(\frac{s_1}{s_2}\right).$$

Since both $m_1$ and $m_2$ are integers, $s_1/s_2$ is also an integer. As a result, $s_1$ is a multiple of $s_2$.

On the other hand, similarly there is some $m'_2 > m_2$ such that $m'_2 \cdot s_2 + r_2 = b = m_1 \cdot s_1 + r_1$. Accordingly, it can be observed that $m'_2 \cdot s_2 + r_2 = m_2 \cdot s_2 + r_1$, which yields $m'_2 = m_2 + (r_1 - r_2)/s_2$. Since both $m'_2$ and $m_2$ are integers, $(r_1 - r_2)/s_2$ is an integer. Hence, $\iota_r = r_1 - r_2$ is a multiple of $s_2$.

Proof of Theorem 2: The three properties described in Theorem 2 is proved separately as shown below.

Reflexivity: By Definition 1, a window W is covered by itself.

Antisymmetry: Suppose that $W_1 \leq W_2$ and $W_2 \leq W_1$. An arbitrary interval [a, b) contained by $W_1$ is considered. Since $W_1 \leq W_2$, there exists two intervals $I_x = [a, x)$ and $I_y = [y, b)$ in $W_2$. On the other hand, since $W_2 \leq W_1$, for $I_x$ there exists intervals $I_{x'} = [a, x')$ and $I_{x''} = [x'', x)$ in $W_1$. Since no two intervals in a window start from the same time point but end at different time points, it can be concluded that $x' = b$. Since $x' \leq x \leq b$ by Definition 1, it can be observed that $x = x' = x'' = b$. Using similar arguments, it can be shown that $y = y' = y'' = a$. As a result, it is proved that $W_1 = W_2$.

Transitivity: Suppose that $W_1 \leq W_2$ and $W_2 \leq W_3$. An arbitrary interval [a, b) in $W_1$ is again considered. Since $W_1 \leq W_2$, there exists two intervals $I_x = [a, x)$ and $I_y = [y, b)$ in $W_2$. Moreover, since $W_2 \leq W_3$, there exists two intervals $I_{x'} = [a, x')$ and $I_{x''} = [xI, x)$ in $W_3$, and there also exists two intervals $I_{y'} = [y, y')$ and $I_{y''} = [y'', b)$ in $W_3$. Further, $I_{x'}$ and $I_{y''}$ is also considered. By Definition 1, it is observed that $x' \leq x \leq b$ and $y'' \geq y \geq a$. Since [a, b) is an arbitrary interval in $W_1$, it follows that $W_1 \leq W_3$.

Proof of Theorem 3: If a union of the intervals in $\mathcal{G}_{a,b}$ is taken, it can be seen that $I = \cup_{J \in \mathcal{G}_{a,b}} J$. By Definition 1, the intervals in $\mathcal{G}_{a,b}$ can be enumerated as $J_1 = [x_1, y_1), \ldots, J_n = [x_n, y_n)$ such that $x_1 = a$, $y_n = b$, and $x_1 < \ldots < x_n$, where $n = |\mathcal{G}_{a,b}|$. Therefore, $I = J_1 \cup (J_2 - J_1) \cup \ldots \cup (J_n - J_{n-1})$.

Since the intervals $J_1, J_2 - J_1, \ldots, J_n - J_{n-1}$ are mutually exclusive, it follows that $|I| = |J_1| + |J_2 - J_1| + \ldots + |J_n - J_{n-1}|$. In this scenario, $|I| = r_1$, $|J_1| = r_2$, and $|J_k - J_{k-1}| = s_2$ for $2 \leq k \leq n$. As a result, $r_1 = r_2 + (n-1) \cdot s_2$, which yields $M(W_1, W_2) = n = 1 + (r_1 - r_2)/s_2$.

Proof of Theorem 4: With respect to the "if" portion, suppose that conditions (1) to (3) hold. By (2) and (3), it is known that $r_1 - r_2$ is a multiple of $s_2$. Combining with (1), $W_1$ is covered by $W_2$ according to Theorem 1. An arbitrary interval I in $W_1$ is considered. The covering set of I in $W_2$ is represented as $\mathcal{G}$. It is shown that $\mathcal{G}$ is disjoint in cases.

By (2) and (3) it is known that that $r_1$ is a multiple of $r_2$. As a result, $r_1 = k \cdot r_2$ where k is an integer. To show that $\mathcal{G}$ is disjoint, it can be shown that that $|\mathcal{J}| = k$ (as shown in FIG. 9(a)). The following relationships can then be observed:

$$|\mathcal{J}| = 1 + (r_1 - r_2)/s_2 \quad \text{[by Theorem 3]}$$
$$= 1 + (k \cdot r_2 - r_2)/s_2 \quad \text{[by condition (2)]}$$
$$= 1 + (k - 1) \quad \text{[by condition (3)]}$$
$$= k$$

With respect to the "only if" portion, suppose that $W_1$ is partitioned by $W_2$. By Theorem 1, condition (1) holds. Again, an arbitrary interval I in $W_1$ is considered, and its covering set in $W_2$ is $\mathcal{G}$. It is known that $\mathcal{G}$ is disjoint, which implies condition (3), i.e., $r_2 = s_2$, as well as that $r_1$ is a multiple of $r_2$. Therefore, $r_1$ is also a multiple of $s_2$ and condition (2) holds.

Proof of Theorem 6: The proof in this section is described with respect to a MIN function distributive over overlapping partitions, as the proof for MAX is similar. In this proof, both f and g are set in the definition of distributive aggregate function as MIN. It is seen that, if two sets $S_1$ and $S_2$ satisfy $S_1 \subseteq S_2$, then $\text{MIN}(S_2) \leq \text{MIN}(S_1)$. Moreover, for any set S, $\text{MIN}(S) \in S$ and thus $\{\text{MIN}(S)\} \subseteq S$. Therefore, $S = \text{MIN}(T_1), \ldots, \text{MIN}(T_n) \subseteq T_1 \cup \ldots \cup T_n$, since $\text{MIN}(T_1) \subseteq T_1, \ldots \text{MIN}(T_n) \subseteq T_n$. As a result, $\text{MIN}(T) \leq \text{MIN}(S) = \text{MIN}(\{\text{MIN}(T_1), \ldots, \text{MIN}(T_n)\})$. It is noted that each element in T is treated differently, even if some of them have the same data value.

It can now be proven that that $\text{MIN}(S) \leq \text{MIN}(T)$. The following relationships can be set for this purpose:

$$S_1 = T_1,$$
$$S_2 = T_2 - T_1,$$
$$S_3 = T_3 - (S_1 \cup S_2),$$
$$\ldots$$
$$S_n = T_n - (S_1 \cup \ldots \cup S_{n-1}).$$

Accordingly, it can be observed that $T = S_1 \cup \ldots \cup S_n$, and $S_i \cap S_j = \emptyset$ for all $1 \leq i, j \leq n$. Therefore, $\text{MIN}(T) = \text{MIN}(S_1 \cup \ldots \cup S_n)$. Moreover, there exists some j such that $\text{MIN}(S_j) = \text{MIN}(T)$. Since $S_j \subseteq T_j$, $\text{MIN}(S_j) \geq \text{MIN}(T_j)$. As a result:

$$\text{MIN}(T) = \text{MIN}(\{\text{MIN}(S_1), \ldots, \text{MIN}(S_n)\})$$
$$\geq \text{MIN}(\{\text{MIN}(T_1), \ldots, \text{MIN}(T_n)\})$$
$$= \text{MIN}(S)$$

Since both $\text{MIN}(S) \leq \text{MIN}(T)$ and $\text{MIN}(T) \leq \text{MIN}(S)$ are proved, it therefore also holds that that $\text{MIN}(S) = \text{MIN}(T)$.

Proof of Theorem 8: Since both $W_f$ and $W$ in FIG. 14 are tumbling windows as described earlier $k_f = k_W = 1$. Equation 3 then yields $$\Sigma_{j=1}^{K} \frac{n_j}{n_f} \left( \frac{r_j}{s_f} - \frac{r_j}{s_W} \right) + \frac{r_f}{s_W} \leq 0.$$

Since $r_f = s_f$ and $r_W = s_W$, it follows that $$\sum_{j=1}^{K} \frac{n_j}{n_f}\left(\rho_j - \frac{r_j}{r_W}\right) + \frac{r_f}{r_W} \leq 0.$$

Since by definition, it can also be observed that $$\sum_{j=1}^{K} \frac{n_j \rho_j}{n_f}\left(1 - \frac{r_f}{r_W}\right) + \frac{r_f}{r_W} \leq 0.$$

Moreover, by definition of $n_f$ $$n_f = (m_f - 1)k_f + 1 = m_f = \frac{R}{r_f} = \frac{R\rho_j}{r_j} = m_j \rho_j. \qquad \text{(Equation 1)}$$

Substituting into Equation 6, it follows that $$\left(1 - \frac{r_f}{r_W}\right) \cdot \lambda + \frac{r_f}{r_W} \leq 0,$$

where $\lambda$ has been defined in Equation 4. As a result, $$\frac{r_f}{r_W} \geq \frac{\lambda}{\lambda - 1}.$$

Since $n_j = (m_j - 1)k_j + 1 \geq m_j$, by Equation 4 it is observed that $\lambda \geq K$.

Two cases are distinguished in examples: the case of $K \geq 2$ and the case of $K = 1$. Each is described in greater detail below.

The Case of $K \geq 2$. When $K \geq 2$, it is seen that $$\frac{\lambda}{\lambda - 1} \leq \frac{K}{K - 1} \leq 2.$$

Since $$\frac{r_f}{r_W} \geq 2,$$

Equation 8 holds, which implies $c \leq c'$. Note that the equality $c = c'$ only holds when $r_f = 2r_W$ and $\lambda = K = 2$, which implies $n_j = m_j$ for $j = 1, 2$. In this case, both downstream windows of W (and thus $W_f$) are tumbling, and $W_f$ doubles the range of W, which occur in some cases.

The Case of $K = 1$. When $K = 1$, $$\lambda = \frac{n_1}{m_1}.$$

If $k_1 = 1$, which means that the (unique) downstream window is tumbling, then $n_1 = m_1$ and thus $\lambda = 1$. Equation 7 then implies that $1 \leq 0$, which is not possible. As a result, $c \leq c'$ does not hold. If $k_1 > 1$, then $\lambda > 1$ and thus the right-hand side of Equation 8 is well-defined. Note that $m_1 > 1$, since if $m_1 = 1$ then $n_1 = (m_1 - 1)k_1 + 1 = 1$ and thus $\lambda = 1$, a contradiction. Substituting $$\lambda = \frac{n_1}{m_1},$$

the following relationships are obtained:

$$\frac{\lambda}{\lambda - 1} = 1 + \frac{m_1}{n_1 - m_1}$$
$$= 1 + \frac{m_1}{(m_1 - 1)(k_1 - 1)}$$
$$= 1 + \frac{1}{k_1 - 1} + \frac{1}{(m_1 - 1)(k_1 - 1)}.$$

As a result, when $k_1 \geq 3$ and $$m_1 \geq 3,$$

$$\frac{\lambda}{\lambda - 1} \leq 1 + \frac{1}{2} + \frac{1}{4} < 2,$$

and thus Equation 8 holds without equality as $r_f \geq 2r_W$, which implies $c < c'$. For the other two cases where one of $k_1$ and $m_1$ is 2 and the other is 3, the left-hand side and right-hand side are compared to determine whether Equation 8 holds.

Proof of Theorem 9: The relationship $d = c_f - c'_f$ is specified. It then follows that:

$$d = \sum_{j=1}^{K} n_j (M(W_j, W_f) - M(W_j, W'_f)) + \Delta$$
$$= \sum_{j=1}^{K} n_j \left(\frac{r_j - r_j}{s_f} - \frac{r_j r'_f}{s'_f}\right) + \Delta$$
$$= \sum_{j=1}^{K} n_j \left(\frac{r_j}{s_f} - k_f - \frac{r_j}{s'_f} + k'_f\right) + \Delta,$$

where $$\Delta = n_f \cdot M(W_f, W) - n'_f \cdot M(W'_f, W)$$
$$= n_f \left(1 + \frac{r_f - r_W}{s_W}\right) - n'_f \left(1 + \frac{r'_f - r_W}{s_W}\right)$$
$$= n_f \left(1 + \frac{r_f}{s_W} - k_W\right) - n'_f \left(1 + \frac{r'_f}{s_W} - k_W\right)$$

In situations, therefore, $W_f$ is more beneficial if $d < 0$.

Further, since $W_f$, $W'_f$, and W are tumbling windows, $k_f = k'_f = k_W = 1$. Substituting into Equation 9 and using the facts $r_f = s_f$, $r'_f = s'_f$, and $r_W = s_W$ yields $$c_f - c'_f = \sum_{j=1}^{K} n_j \left(\frac{r_j}{r_f} - \frac{r_j}{r'_f}\right) + n_f \cdot \frac{r_f}{r_W} - n'_f \cdot \frac{r'_f}{r_W}$$
$$= n_f \left(\sum_{j=1}^{K} \frac{n_j}{n_f}\left(\frac{r_j}{r_f} - \frac{r_j}{r'_f}\right) + \frac{r_f}{r_W} - \frac{n'_f}{n_f} \cdot \frac{r'_f}{r_W}\right).$$

It is considered when $c_f \leq c'_f$ holds, or equivalently:

$$\sum_{j=1}^{K} \frac{n_j}{n_f}\left(\frac{r_j}{r_f} - \frac{r_j}{r'_f}\right) + \frac{r_f}{r_W} - \frac{n'_f}{n_f} \cdot \frac{r'_f}{r_W} \leq 0.$$

Similarly, it is defined that $$\rho_j = \frac{r_j}{r_f},$$

$$\rho_{j'} = \frac{r_j}{r'_f},$$

and $\forall 1 \leq j \leq K$. Since $W_f$ is tumbling $$n_f = m_f = \frac{R}{r_f} = \frac{m_j r_j}{r_f} = m_j \rho_j.$$

It therefore follows that $$\sum_{j=1}^{K} \frac{n_j}{m_j \rho_j}(\rho_j - \rho'_j) + \frac{r_f}{r_W} - \frac{n'_f}{n_f} \cdot \frac{r'_f}{r_W} \leq 0.$$

It is be noted that $$\frac{\rho'_j}{\rho_j} = \frac{r_j / r'_f}{r_j / r_f} = \frac{r_f}{r'_f}.$$

With rearrangement of certain terms, it is observed that $$\left(1 - \frac{r_f}{r'_f}\right)\sum_{j=1}^{K} \frac{n_j}{m_j} + \frac{r'_f}{r_W}\left(\frac{r_f}{r'_f} - \frac{n'_f}{n_f}\right) \leq 0.$$

As before, it is defined that $$\lambda = \sum_{j=1}^{K} \frac{n_j}{m_j}.$$

It then follows that:

$$\frac{r_f}{r'_f} \geq \frac{\lambda - \frac{r'_f}{r_W} \cdot \frac{n'_f}{n_f}}{\lambda - \frac{r'_f}{r_W}}.$$

Moreover, since both $W_f$ and $W'_f$ are tumbling windows, $n_f = m_f$ and $n'_f = m'_f$. Therefore, $$\frac{r'_f}{r_W} \cdot \frac{n'_f}{n_f} = \frac{r'_f}{r_W} \cdot \frac{m'_f}{m_f} = \frac{R}{r_W m_f} = \frac{r_f}{r_W},$$

which yields:

$$\frac{r_f}{r'_f} \geq \frac{\lambda - \frac{r_f}{r_W}}{\lambda - \frac{r'_f}{r_W}}.$$

G. Concluding Remarks

As described herein, a cost-based optimization framework to optimize the evaluation of an aggregate function over multiple correlated windows is provided. For instance, stream query optimizer 108 may leverage the window coverage graph that is described herein to capture overlapping relationships between windows in a query. Further, stream query optimizer 108 may also introduce one or more factor windows into the window coverage graph to also reduce an overall computation overhead. Such techniques may be implemented at the query compilation level, which may avoid the need for runtime support from stream processing engines in some implementations.

IV. EXAMPLE MOBILE AND STATIONARY DEVICE EMBODIMENTS

Data generating entity 102, query processing system 104, query pre-processor 106, stream query optimizer 108, execution engine 110, query generating entity 112, window representation generator 302, initial window representation 304, revised window representation 306, query plan selector 308, query rewriter 310, flowchart 200, flowchart 400, flowchart 500, and/or flowchart 600 may be implemented in hardware, or hardware combined with one or both of software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For instance, one or more of data generating entity 102, query processing system 104, query pre-processor 106, stream query optimizer 108, execution engine 110, query generating entity 112, window representation generator 302, initial window representation 304, revised window representation 306, query plan selector 308, query rewriter 310, flowchart 200, flowchart 400, flowchart 500, and/or flowchart 600 may be implemented separately or together in a System on a Chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. Note that electronic circuits such as ASICs and FPGAs may be used to accelerate various computations such as checksums, hashing, encryption, compression, etc.

Figure 16:
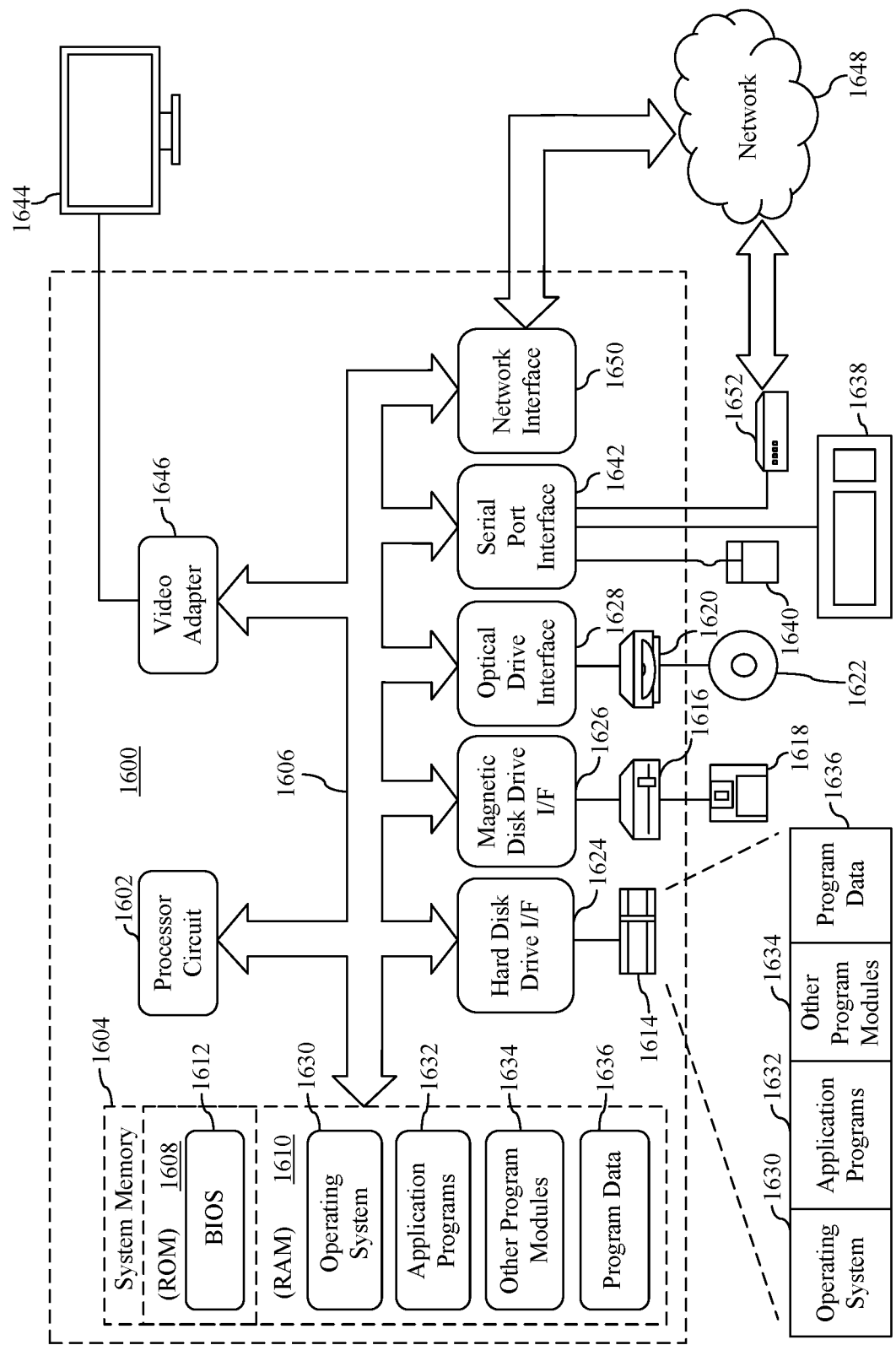
FIG. 16 is a block diagram of an example computing device that may be used to implement example embodiments described herein.

FIG. 16 depicts an example processor-based computer system 1600 that may be used to implement various example embodiments described herein as described above. For example, any of data generating entity 102, query processing system 104, query pre-processor 106, stream query optimizer 108, execution engine 110, query generating entity 112, window representation generator 302, initial window representation 304, revised window representation 306, query plan selector 308, query rewriter 310, and/or any suitable step of flowchart 200, flowchart 400, flowchart 500, and/or flowchart 600 may be implemented in one or more computing devices similar to computing device 1600 in stationary or mobile computer embodiments, including one or more features of computing device 1600 and/or alternative features. The description of system 1600 provided herein is provided for purposes of illustration and is not intended to be limiting. Embodiments may be implemented in further types of computer systems, as would be known to persons skilled in the relevant art(s).

As shown in FIG. 16, system 1600 includes a processing unit 1602, a system memory 1604, and a bus 1606 that couples various system components including system memory 1604 to processing unit 1602. Processing unit 1602 may comprise one or more microprocessors or microprocessor cores. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random-access memory (RAM) 1610. A basic input/output system 1612 (BIOS) is stored in ROM 1608.

System 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, BLU-RAY™ disk or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 1630, one or more application programs 1632, other program modules 1634, and program data 1636. Application programs 1632 or other programs 1634 may include, for example, computer program logic (e.g., computer program code or instructions) for implementing data generating entity 102, query processing system 104, query pre-processor 106, stream query optimizer 108, execution engine 110, query generating entity 112, window representation generator 302, initial window representation 304, revised window representation 306, query plan selector 308, query rewriter 310, flowchart 200, flowchart 400, flowchart 500, and/or flowchart 600 (including any suitable step of flowcharts 200, 400, 500, or 600), and/or further example embodiments described herein.

A user may enter commands and information into system 1600 through input devices such as a keyboard 1638 and a pointing device 1640. Other input devices (not shown) may include a microphone, joystick, game controller, scanner, or the like. In one embodiment, a touch screen is provided in conjunction with a display 1644 to allow a user to provide user input via the application of a touch (as by a finger or stylus for example) to one or more points on the touch screen. These and other input devices are often connected to processing unit 1602 through a serial port interface 1642 that is coupled to bus 1606, but may be connected by other interfaces, such as a parallel port, game port, or a universal serial bus (USB). Such interfaces may be wired or wireless interfaces.

A display 1644 is also connected to bus 1606 via an interface, such as a video adapter 1646. Display screen 1644 may display information, as well as being a user interface for receiving user commands and/or other information (e.g., by touch, finger gestures, virtual keyboard, etc.). In addition to display 1644, system 1600 may include other peripheral output devices (not shown) such as speakers and printers.

System 1600 is connected to a network 1648 (e.g., a local area network, a wide area network such as the Internet, or a data center network) through a network interface or adapter 1650, a modem 1652, or other suitable means for establishing communications over the network. Modem 1652, which may be internal or external, is connected to bus 1606 via serial port interface 1642. As used herein, the terms "computer program medium," "computer-readable medium," and "computer-readable storage medium" are used to generally refer to memory devices or storage structures such as the hard disk associated with hard disk drive 1614, removable magnetic disk 1618, removable optical disk 1622, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650, serial port interface 1642, or any other interface type. Such computer programs, when executed or loaded by an application, enable system 1600 to implement features of embodiments of the present methods and systems described herein. Accordingly, such computer programs represent controllers of the system 1600.

Embodiments are also directed to computer program products comprising software stored on any computer usable medium. Such software, when executed in one or more data processing devices, causes a data processing device(s) to operate as described herein. Embodiments of the present methods and systems employ any computer-usable or computer-readable medium, known now or in the future. Examples of computer-readable mediums include but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

V. ADDITIONAL EXAMPLE EMBODIMENTS

A system for determining a query plan for a query is disclosed herein. The system includes at least one processor circuit; and at least one memory that stores program code configured to be executed by the at least one processor circuit, the program code comprising a window representation generator configured to: identify a plurality of original time windows included in an original query, the original query comprising a request for a data result for each of the plurality of original time windows, generate an initial window representation that identifies a set of connections between windows in a window set that includes at least the plurality of original time windows, and generate a revised window representation that includes an alternative set of connections between windows in the window set based at least on an execution cost for at least one window; and a query plan selector configured to: select the revised window representation to obtain the data result for each of the plurality of original time windows, and provide a revised query plan based on the revised window representation to obtain the data result for each of the plurality of original time windows.

In one implementation of the foregoing system, the data result for each of the plurality of original time windows comprises an aggregation of a data stream over the respective time window.

In another implementation of the foregoing system, the window representation generator is configured to generate the initial window representation that identifies the set of connections between the windows in the window set by generating a tree structure that includes a plurality of nodes, each of which corresponds to a window in the window set; and for at least one downstream node in the tree structure, identifying at least one upstream node that has an overlapping relationship with the at least one downstream node.

In another implementation of the foregoing system, a time interval of the at least one upstream node is a factor of a time interval of the downstream node.

In another implementation of the foregoing system, the window representation generator is configured to generate the revised window representation that includes the alternative set of connections between the windows in the window set by removing, for a downstream window that comprises a connection to each of a plurality of upstream windows in the initial window representation, at least one connection between the downstream window and the plurality of upstream windows.

In another implementation of the foregoing system, the initial window representation and the revised window representation include an auxiliary time window that was not included in the original query, the auxiliary time window comprising a time interval that is a factor of a time interval of at least one of the plurality of original time windows.

In another implementation of the foregoing system, the program code further includes a query rewriter configured to generate a revised query to obtain the data result for each of the plurality of original time windows.

A method implemented by one or more computing devices for determining a query plan for a query is disclosed herein. The method includes identifying a plurality of original time windows included in an original query, the original query comprising a request for a data result for each of the plurality of original time windows; generating an initial window representation that identifies a set of connections between windows in a window set that includes at least the plurality of original time windows; generating a revised window representation that includes an alternative set of connections between windows in the window set based at least on an execution cost for at least one window; selecting the revised window representation to obtain the data result for each of the plurality of original time windows; and providing a revised query plan based on the revised window representation to obtain the data result for each of the plurality of original time windows.

In one implementation of the foregoing method, the data result for each of the plurality of original time windows comprises an aggregation of a data stream over the respective time window.

In another implementation of the foregoing method, the generating the initial window representation that identifies the set of connections between the windows in the window set comprises generating a tree structure that includes a plurality of nodes, each of which corresponds to a window in the window set; and for at least one downstream node in the tree structure, identifying at least one upstream node that has an overlapping relationship with the at least one downstream node.

In another implementation of the foregoing method, a time interval of the at least one upstream node is a factor of a time interval of the downstream node.

In another implementation of the foregoing method, the generating the revised window representation that includes the alternative set of connections between the windows in the window set comprises for a downstream window that comprises a connection to each of a plurality of upstream windows in the initial window representation, removing at least one connection between the downstream window and the plurality of upstream windows.

In another implementation of the foregoing method, the initial window representation and the revised window representation include an auxiliary time window that was not included in the original query, the auxiliary time window comprising a time interval that is a factor of a time interval of at least one of the plurality of original time windows.

In another implementation of the foregoing method, the method further includes generating a revised query to obtain the data result for each of the plurality of original time windows.

A computer-readable memory is disclosed herein. The computer-readable memory has computer program code recorded thereon that when executed by at least one processor causes the at least one processor to perform a method comprising identifying a plurality of original time windows included in an original query, the original query comprising a request for a data result for each of the plurality of original time windows; generating an initial window representation that identifies a set of connections between windows in a window set that includes at least the plurality of original time windows; generating a revised window representation that includes an alternative set of connections between windows in the window set based at least on an execution cost for at least one window; selecting the revised window representation to obtain the data result for each of the plurality of original time windows; and providing a revised query plan based on the revised window representation to obtain the data result for each of the plurality of original time windows.

In one implementation of the foregoing computer-readable memory, the data result for each of the plurality of original time windows comprises an aggregation of a data stream over the respective time window.

In another implementation of the foregoing computer-readable memory, the generating the initial window representation that identifies the set of connections between the windows in the window set comprises generating a tree structure that includes a plurality of nodes, each of which corresponds to a window in the window set; and for at least one downstream node in the tree structure, identifying at least one upstream node that has an overlapping relationship with the at least one downstream node.

In another implementation of the foregoing computer-readable memory, a time interval of the at least one upstream node is a factor of a time interval of the downstream node.

In another implementation of the foregoing computer-readable memory, the revised window representation identifies, for each window, an input from no more than one other window in the window set.

In another implementation of the foregoing computer-readable memory, the initial window representation and the revised window representation include an auxiliary time window that was not included in the original query, the auxiliary time window comprising a time interval that is a factor of a time interval of at least one of the plurality of original time windows.

VI. CONCLUSION

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for determining a query plan for a query, comprising:
   at least one processor circuit; and
   at least one memory that stores program code configured to be executed by the at least one processor circuit, the program code comprising:
   a window representation generator configured to:
      identify a plurality of original time windows associated with a data stream and included in an original query, the original query comprising a request for a data result for each of the plurality of original time windows,
      generate an initial window representation that identifies a set of connections between windows in a window set that includes at least the plurality of original time windows, the connections indicating, for each original time window, whether the original time window can be computed from one or more other windows associated with the data stream, and
      generate a revised window representation that includes an alternative set of connections between windows in the window set based at least on an execution cost for at least one window; and
   a query plan selector configured to:
      select the revised window representation to obtain the data result for each of the plurality of original time windows, and
      provide a revised query plan based on the revised window representation to obtain the data result for each of the plurality of original time windows.

2. The system of claim 1, wherein the data result for each of the plurality of original time windows comprises an aggregation of the data stream over the respective time window.

3. The system of claim 1, wherein the window representation generator is configured to generate the initial window representation that identifies the set of connections between the windows in the window set by:
   generating a tree structure that includes a plurality of nodes, each of which corresponds to a window in the window set; and
   for at least one downstream node in the tree structure, identifying at least one upstream node that has an overlapping relationship with the at least one downstream node.

4. The system of claim 3, wherein a time interval of the at least one upstream node is a factor of a time interval of the downstream node.

5. The system of claim 1, wherein the window representation generator is configured to generate the revised window representation that includes the alternative set of connections between the windows in the window set by:
   removing, for a downstream window that comprises a connection to each of a plurality of upstream windows in the initial window representation, at least one connection between the downstream window and the plurality of upstream windows.

6. The system of claim 1, wherein the initial window representation and the revised window representation include an auxiliary time window that was not included in the original query, the auxiliary time window comprising a time interval that is a factor of a time interval of at least one of the plurality of original time windows.

7. The system of claim 1, wherein the program code further comprises a query rewriter configured to generate a revised query to obtain the data result for each of the plurality of original time windows.

8. A method implemented by one more computing devices for determining a query plan for a query, comprising:
   identifying a plurality of original time windows associated with a data stream and included in an original query, the original query comprising a request for a data result for each of the plurality of original time windows, the connections indicating, for each original time window, whether the original time window can be computed from one or more other windows associated with the data stream;
   generating an initial window representation that identifies a set of connections between windows in a window set that includes at least the plurality of original time windows;
   generating a revised window representation that includes an alternative set of connections between windows in the window set based at least on an execution cost for at least one window;
   selecting the revised window representation to obtain the data result for each of the plurality of original time windows; and
   providing a revised query plan based on the revised window representation to obtain the data result for each of the plurality of original time windows.

9. The method of claim 8, wherein the data result for each of the plurality of original time windows comprises an aggregation of the data stream over the respective time window.

10. The method of claim 8, wherein the generating the initial window representation that identifies the set of connections between the windows in the window set comprises:
generating a tree structure that includes a plurality of nodes, each of which corresponds to a window in the window set; and
for at least one downstream node in the tree structure, identifying at least one upstream node that has an overlapping relationship with the at least one downstream node.

11. The method of claim 10, wherein a time interval of the at least one upstream node is a factor of a time interval of the downstream node.

12. The method of claim 8, wherein the generating the revised window representation that includes the alternative set of connections between the windows in the window set comprises:
for a downstream window that comprises a connection to each of a plurality of upstream windows in the initial window representation, removing at least one connection between the downstream window and the plurality of upstream windows.

13. The method of claim 8, wherein the initial window representation and the revised window representation include an auxiliary time window that was not included in the original query, the auxiliary time window comprising a time interval that is a factor of a time interval of at least one of the plurality of original time windows.

14. The method of claim 8, further comprising:
generating a revised query to obtain the data result for each of the plurality of original time windows.

15. A computer-readable memory having computer program code recorded thereon that when executed by at least one processor causes the at least one processor to perform a method comprising:
identifying a plurality of original time windows associated with a data stream and included in an original query, the original query comprising a request for a data result for each of the plurality of original time windows;
generating an initial window representation that identifies a set of connections between windows in a window set that includes at least the plurality of original time windows, the connections indicating, for each original time window, whether the original time window can be computed from one or more other windows associated with the data stream;
generating a revised window representation that includes an alternative set of connections between windows in the window set based at least on an execution cost for at least one window;
selecting the revised window representation to obtain the data result for each of the plurality of original time windows; and
providing a revised query plan based on the revised window representation to obtain the data result for each of the plurality of original time windows.

16. The computer-readable memory of claim 15, wherein the data result for each of the plurality of original time windows comprises an aggregation of the data stream over the respective time window.

17. The computer-readable memory of claim 15, wherein the generating the initial window representation that identifies the set of connections between the windows in the window set comprises:
generating a tree structure that includes a plurality of nodes, each of which corresponds to a window in the window set; and
for at least one downstream node in the tree structure, identifying at least one upstream node that has an overlapping relationship with the at least one downstream node.

18. The computer-readable memory of claim 17, wherein a time interval of the at least one upstream node is a factor of a time interval of the downstream node.

19. The computer-readable memory of claim 15, wherein the revised window representation identifies, for each window, an input from no more than one other window in the window set.

20. The computer-readable memory of claim 15, wherein the initial window representation and the revised window representation include an auxiliary time window that was not included in the original query, the auxiliary time window comprising a time interval that is a factor of a time interval of at least one of the plurality of original time windows.

* * * * *